United States Patent
Levola et al.

(10) Patent No.: US 10,345,601 B2
(45) Date of Patent: Jul. 9, 2019

(54) WEARABLE IMAGE DISPLAY SYSTEM

(71) Applicant: Microsoft Technology Licensing, LLC, Redmond, WA (US)

(72) Inventors: Tapani Levola, Espoo (FI); Pasi Saarikko, Espoo (FI); Steven John Robbins, Bellevue, WA (US); Yarn Chee Poon, Redmond, WA (US); Lena Adele Wolfe, Seattle, WA (US); Erica Lee Towle, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/987,795

(22) Filed: May 23, 2018

(65) Prior Publication Data
US 2018/0267318 A1     Sep. 20, 2018

Related U.S. Application Data

(63) Continuation of application No. 14/617,769, filed on Feb. 9, 2015, now Pat. No. 10,018,844.

(51) Int. Cl.
*G02B 5/18*     (2006.01)
*G02B 27/01*    (2006.01)
(Continued)

(52) U.S. Cl.
CPC ........... *G02B 27/0172* (2013.01); *G02B 6/00* (2013.01); *G02B 6/005* (2013.01); *G02B 6/0016* (2013.01);
(Continued)

(58) Field of Classification Search
CPC .... G02B 27/28; G02B 27/0123; G02B 27/10; G02B 27/44; G02B 27/60; G02B 27/01;
(Continued)

(56) References Cited

U.S. PATENT DOCUMENTS 5,170,153 A * 12/1992 Migozzi ............ F41G 3/225
                                                  345/8
5,315,676 A    5/1994 Sunagawa
(Continued)

FOREIGN PATENT DOCUMENTS

| CN | 101446684 A | 6/2009 |
| CN | 101460884 A | 6/2009 |
| CN | 103969840 A | 8/2014 |

OTHER PUBLICATIONS

"Non Final Office Action Issued in U.S. Appl. No. 14/617,666", dated Sep. 25, 2018, 24 Pages.
(Continued)

*Primary Examiner* — William R Alexander
*Assistant Examiner* — Tamara Y Washington
(74) *Attorney, Agent, or Firm* — Rainier Patents, P.S.

(57) ABSTRACT

A wearable image display system includes a headpiece, a first and a second light engine, and a first and a second optical component. The first and second light engines generate a first and a second set of beams respectively, each beam substantially collimated so that the first and second set form a first and a second virtual image respectively. Each optical component is located to project an image onto a first and a second eye of a wearer respectively. The first and second sets of beams are directed to incoupling structures of the first and second optical components respectively. Exit structures of the first and second optical components guide the first and second sets of beams onto the first and second eyes respectively. The optical components are located between the light engines and the eyes. Both of the light engines are mounted to a central portion of the headpiece.

20 Claims, 14 Drawing Sheets

(51) Int. Cl.
*G06T 19/00* (2011.01)
*F21V 8/00* (2006.01)
*G02B 27/00* (2006.01)
*G02B 27/42* (2006.01)
*G02B 6/00* (2006.01)

(52) U.S. Cl.
CPC ....... *G02B 6/0035* (2013.01); *G02B 27/0018* (2013.01); *G02B 27/0081* (2013.01); *G02B 27/4272* (2013.01); *G06T 19/006* (2013.01); *G02B 27/0176* (2013.01); *G02B 2027/011* (2013.01); *G02B 2027/0123* (2013.01); *G02B 2027/0134* (2013.01); *G02B 2027/0152* (2013.01); *G02B 2027/0161* (2013.01); *G02B 2027/0178* (2013.01)

(58) Field of Classification Search
CPC ............ G02B 27/0101; G02B 27/0105; G02B 27/0125; G02B 27/017; G02B 27/0172; G02B 27/42; G02B 5/1866; G02B 5/1842; G02B 6/0016; G02B 6/0033; G02B 2027/011; G02B 2027/0123; G02B 2027/0125; G02B 2027/0178; G02B 2027/0174
USPC ....... 359/1, 13, 14, 15, 19, 32, 34, 558–576, 359/629–634, 204.5, 207.7, 211.6, 359/337.21, 256, 538, 618; 345/6–9, 345/632–633; 715/757
See application file for complete search history.

(56) References Cited

U.S. PATENT DOCUMENTS

| | | | | | |
|---|---|---|---|---|---|
| 5,991,087 | A * | 11/1999 | Rallison | ................ | G02B 6/08 359/630 |
| 6,144,439 | A * | 11/2000 | Carollo | ................ | G02B 5/3016 345/7 |
| 7,513,627 | B2 * | 4/2009 | Larson | ................ | G03B 21/145 353/46 |
| 7,719,769 | B2 * | 5/2010 | Sugihara | ............ | G02B 6/0011 345/8 |
| 8,246,170 | B2 * | 8/2012 | Yamamoto | ........... | G02B 26/101 345/8 |
| 8,472,119 | B1 * | 6/2013 | Kelly | ................ | G02B 5/30 345/8 |
| 8,576,143 | B1 * | 11/2013 | Kelly | ................ | G02B 27/017 345/8 |
| 8,629,815 | B2 * | 1/2014 | Brin | ................ | G02B 27/017 345/156 |
| 9,519,591 | B2 | 12/2016 | Lomet et al. | | |
| 9,759,932 | B1 * | 9/2017 | Ainsworth | ............ | G02C 11/10 |
| 2002/0076154 | A1 * | 6/2002 | Maisenhoelder | .... | G01N 21/552 385/37 |
| 2006/0132914 | A1 * | 6/2006 | Weiss | ................ | G02B 5/32 359/462 |
| 2010/0309687 | A1 * | 12/2010 | Sampsell | ............ | G02B 6/0053 362/627 |
| 2010/0315781 | A1 * | 12/2010 | Agostini | ............ | F28D 15/0233 361/700 |
| 2010/0317132 | A1 * | 12/2010 | Rogers | ................ | H01L 25/0753 438/27 |
| 2010/0321609 | A1 * | 12/2010 | Qi | ................ | G02B 6/0036 349/62 |
| 2010/0328351 | A1 * | 12/2010 | Tan | ................ | G06F 3/041 345/661 |
| 2011/0012814 | A1 * | 1/2011 | Tanaka | ............ | G02B 27/0176 345/8 |
| 2011/0025605 | A1 * | 2/2011 | Kwitek | ............ | G06F 1/1616 345/168 |
| 2011/0032482 | A1 * | 2/2011 | Agurok | ............ | G02B 27/0075 353/7 |
| 2011/0050547 | A1 * | 3/2011 | Mukawa | ............ | G02B 27/0176 345/8 |
| 2011/0050655 | A1 * | 3/2011 | Mukawa | ............ | G02B 27/0172 345/204 |
| 2011/0075442 | A1 * | 3/2011 | Chiang | ............ | H04M 1/0266 362/606 |
| 2011/0110728 | A1 * | 5/2011 | Kim | ............ | E02D 29/0225 405/284 |
| 2011/0114823 | A1 * | 5/2011 | Katzir | ............ | G01N 21/8851 250/208.1 |
| 2011/0134017 | A1 * | 6/2011 | Burke | ............ | G02B 27/0101 345/32 |
| 2012/0033306 | A1 * | 2/2012 | Valera | ............ | G02B 27/0081 359/630 |
| 2012/0044573 | A1 * | 2/2012 | Simmonds | ......... | G02B 27/0172 359/631 |
| 2012/0235885 | A1 * | 9/2012 | Miller | ............ | G02B 27/0093 345/8 |
| 2012/0242561 | A1 * | 9/2012 | Sugihara | ............ | G02B 27/0172 345/8 |
| 2013/0249895 | A1 | 9/2013 | Westerinen et al. | | |
| 2013/0314789 | A1 * | 11/2013 | Saarikko | ............ | G02B 27/0081 359/489.07 |
| 2014/0111865 | A1 * | 4/2014 | Kobayashi | ............ | G02B 5/003 359/633 |
| 2014/0204455 | A1 * | 7/2014 | Popovich | ............ | G02B 6/0028 359/316 |
| 2014/0310646 | A1 | 10/2014 | Vranjes et al. | | |
| 2016/0041394 | A1 * | 2/2016 | Tanaka | ............ | G02B 27/0172 359/630 |

OTHER PUBLICATIONS

"Non Final Office Action Issued in U.S. Appl. No. 14/617,769", dated Jan. 12, 2017, 11 Pages.
"Final Office Action Issued in U.S. Appl. No. 14/617,666", dated Jan. 22, 2019, 23 Pages.
"Office Action and Search Report Issued in Chinese Patent Application No. 201680009438.3", dated Feb. 22, 2019, 20 Pages.
"Office Action and Search Report Issued in Chinese Patent Application No. 201680009551.1", dated Feb. 3, 2019, 17 Pages.
"Office Action and Search Report Issued in Chinese Patent Application No. 201680009547.5", dated Feb. 3, 2019, 16 Pages.
"Office Action and Search Report Issued in Chinese Patent Application No. 2016800094546", dated Feb. 11, 2019, 16 Pages.

* cited by examiner (Plan view)

(Plan view)

(Frontal view)

(Plan view)

(Frontal view)

(Plan view)

(Frontal view)

(Frontal view)

WEARABLE IMAGE DISPLAY SYSTEM

RELATED APPLICATION

This application is a continuation of and claims priority to U.S. patent application Ser. No. 14/617,769, filed Feb. 9, 2015, entitled "Wearable Image Display System", the entire disclosure of which is hereby incorporated by reference herein in its entirety.

BACKGROUND

Display systems can used to make a desired image visible to a user (viewer). Wearable display systems can be embodied in a wearable headset which is arranged to display an image within a short distance from a human eye. Such wearable headsets are sometimes referred to as head mounted displays, and are provided with a frame which has a central portion fitting over a user's (wearer's) nose bridge and left and right support extensions which fit over a user's ears. Optical components are arranged in the frame so as to display an image within a few centimeters of the user's eyes. The image can be a computer generated image on a display, such as a micro display. The optical components are arranged to transport light of the desired image which is generated on the display to the user's eye to make the image visible to the user. The display on which the image is generated can form part of a light engine, such that the image itself generates collimated lights beams which can be guided by the optical component to provide an image visible to the user.

Different kinds of optical components have been used to convey the image from the display to the human eye. These can include lenses, mirrors, optical waveguides, holograms and diffraction gratings, for example. In some display systems, the optical components are fabricated using optics that allows the user to see the image but not to see through this optics at the "real world". Other types of display systems provide a view through its optics so that the generated image which is displayed to the user is overlaid onto a real world view. This is sometimes referred to as augmented reality.

Waveguide-based display systems typically transport light from a light engine to the eye via a TIR (Total Internal Reflection) mechanism in a waveguide (light guide). Such systems can incorporate diffraction gratings, which cause effective beam expansion so as to output expanded versions of the beams provided by the light engine. This means the image is visible over a wider area when looking at the waveguide's output than when looking at the light engine directly: provided the eye is within an area such that it can receive some light from substantially all (i.e. all or most) of the expanded beams, the whole image will be visible to the user. Such an area is referred to as an eye box.

In one type of head mounted display, the frames support two light engines, which each generate an image for a respective eye, with respective guiding mechanisms which each guide the image to project it at a proper location with respect to the associated eye so that the wearer's eyes operate in unison to receive a single non-distorted image.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Nor is the claimed subject matter limited to implementations that solve any or all of the disadvantages noted in the background section.

A wearable image display system comprises a headpiece, a first and a second light engine, and a first and a second optical component. The first and second light engines are configured to generate a first and a second set of beams respectively. Each beam is substantially collimated so that the first and second set form a first and a second virtual image respectively. The light engines are mounted on the headpiece. Each optical component is located to project an image onto a first and a second eye of a wearer respectively and comprises an incoupling structure and an exit structure. The first and second sets of beams are directed to the incoupling structures of the first and second optical components respectively. The exit structures of the first and second optical components are arranged to guide the first and second sets of beams onto the first and second eyes respectively. The optical components are located between the light engines and the eyes. Both of the light engines are mounted to a central portion of the headpiece.

DETAILED DESCRIPTION

Typically, a waveguide based display system comprises an image source, e.g. a projector, waveguide(s) and various optical elements (e.g. diffraction gratings or holograms) imprinted on the waveguide surfaces. The optical elements are used, for example, to couple light emitted by the image source into and out of the waveguide, and/or for manipulation of its spatial distribution within the waveguide.

Figure 1:
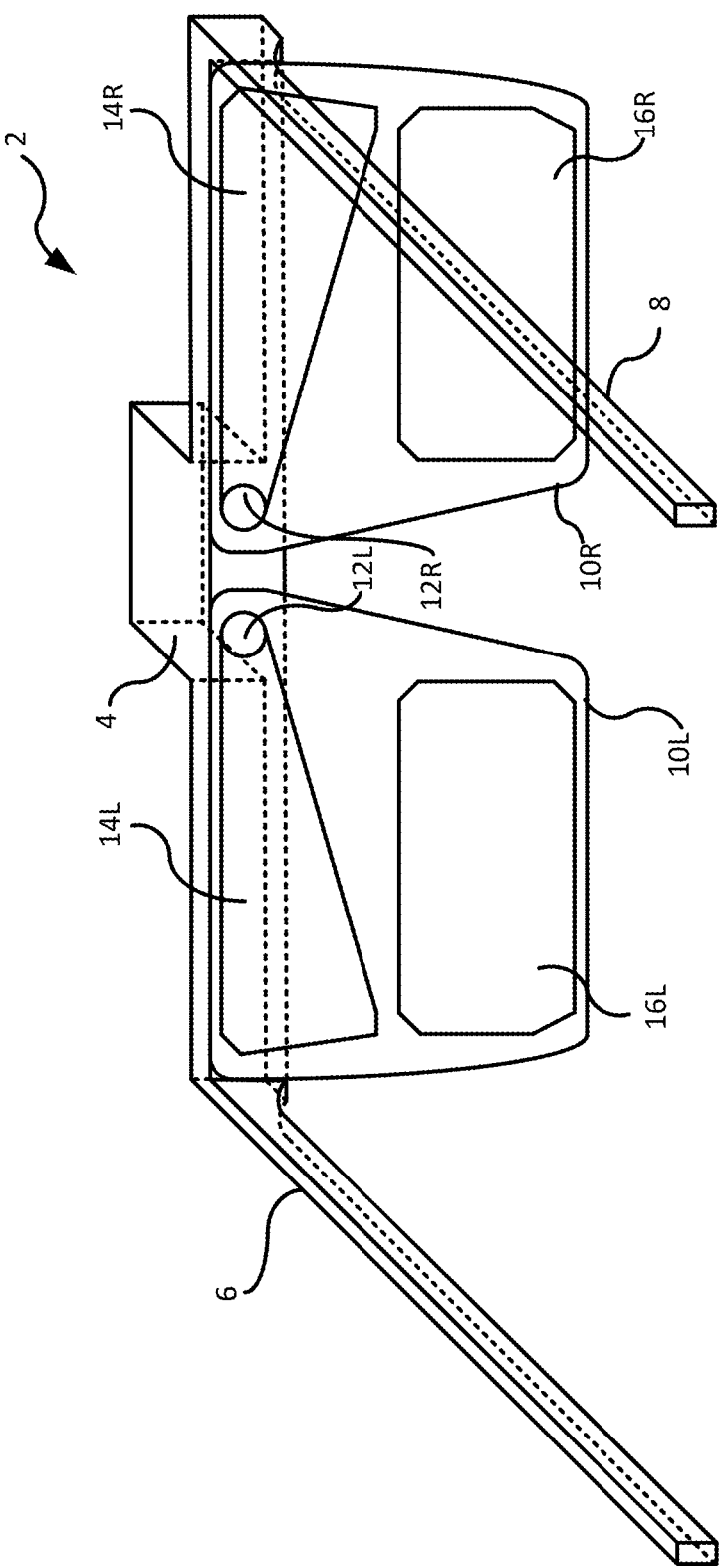
FIG. 1 shows a wearable display system.

FIG. 1 is a perspective view of a head mounted display. The head mounted display comprises a headpiece, which comprises a frame (2) having a central portion (4) intended to fit over the nose bridge of a wearer, and a left and right supporting extension (6, 8) which are intended to fit over a user's ears. Although the supporting extensions are shown to be substantially straight, they could terminate with curved parts to more comfortably fit over the ears in the manner of conventional spectacles.

The frame 2 supports left and right optical components, labelled 10L and 10R, which are waveguides e.g. formed of glass or polymer. For ease of reference herein an optical component 10 (which is a waveguide) will be considered to be either a left or right component, because the components are essentially identical apart from being mirror images of each other. Therefore, all description pertaining to the left-hand component also pertains to the right-hand component. The optical components will be described in more detail later with reference to FIG. 3. The central portion (4) houses two light engines which are not shown in FIG. 1 but one of which is shown in FIG. 2A.

Figure 2A:
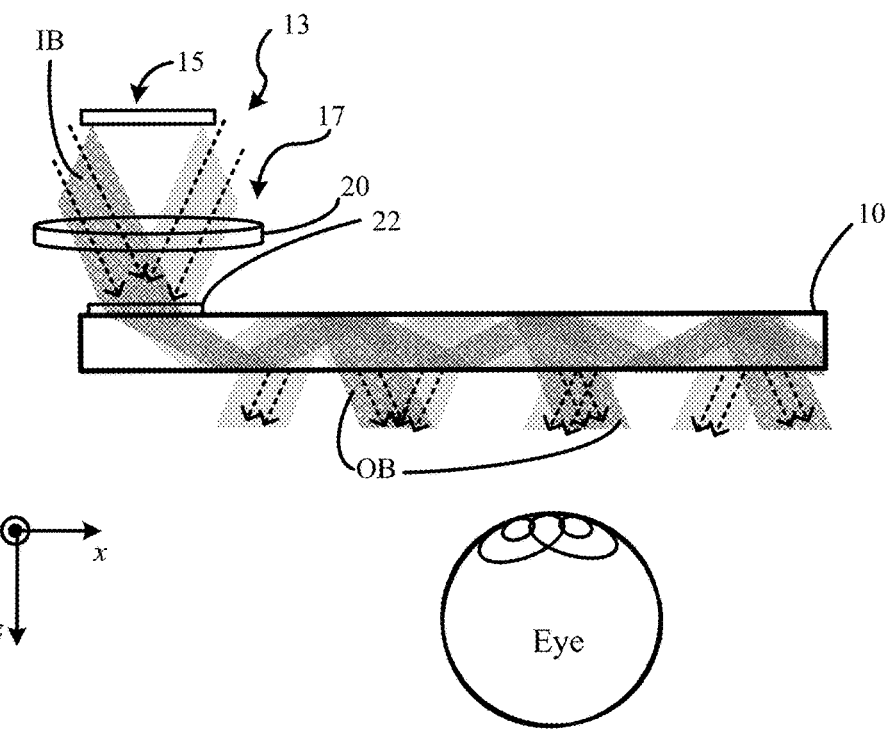
FIG. 2A shows a plan view of part of the display system.

FIG. 2A shows a plan view of a section of the top part of the frame of FIG. 1. Thus, FIG. 2A shows the light engine 13 which comprises a micro display 15 and imaging optics 17 including a collimating lens 20. The light engine also includes a processor which is capable of generating an image for the micro display. The micro display can be any type of image source, such as liquid crystal on silicon (LCOS) displays transmissive liquid crystal displays (LCD), matrix arrays of LED's (whether organic or inorganic) or any other suitable display. The display is driven by circuitry which is not visible in FIG. 2A which activates individual pixels of the display to generate an image. The substantially collimated light, from each pixel, falls on an exit pupil 22 of the light engine 13. At exit pupil 22, collimated light beams are coupled into each optical component, 10L, 10R into a respective in-coupling zone 12L, 12R provided on each component. These in-coupling zones are clearly shown in FIG. 1, but are not readily visible in FIG. 2A. In-coupled light is then guided, through a mechanism that involves diffraction and TIR, laterally of the optical component in a respective intermediate (fold) zone 14L, 14R, and also downward into a respective exit zone 16L, 16R where it exits the component 10 towards the users' eye. The zones 14L, 14R, 16L and 16R are shown in FIG. 1. These mechanisms are described in detail below. FIG. 2A shows a user's eye (right or left) receiving the diffracted light from an exit zone (16L or 16R). The output beam OB to a user's eye is parallel with the incident beam IB. See, for example, the beam marked IB in FIG. 2A and two of the parallel output beams marked OB in FIG. 2A. The optical component 10 is located between the light engine 13 and the eye i.e. the display system configuration is of so-called transmissive type.

The optical component 10 is substantially transparent such that a user can not only view the image from the light engine 13, but also can view a real world view through the optical component 10.

The optical component 10 has a refractive index n which is such that total internal reflection takes place guiding the beam from the in-coupling zone 12 along the intermediate expansion zone 14, and down towards the exit zone 16.

Figure 2B:
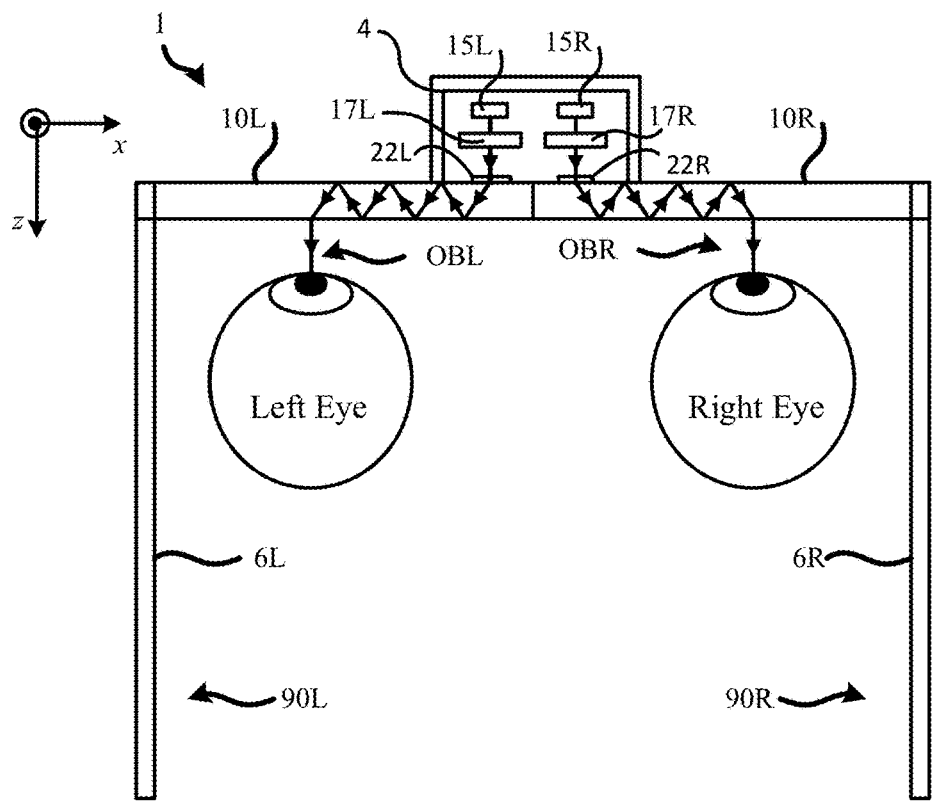
FIG. 2B shows a plan view of the display system.

FIG. 2B shows a plan view of the display system 1. Separate left and right displays (15L, 15R), each with their own imaging optics (17L, 17R) are housed in the central portion (4). These constitute separate light engines 13L, 13R of the kind just described. Beams created by the left imaging optics (17L, respective right imaging optics 17R) from a left image on the left display (15L, respective right image on the right display 15R) are coupled into the left optical component (10L, respective right optical component 10R). The beams of the left image (respective right image) are guided though the left component (10L, respective right component 10R) and onto the user's left (respective right eye). The guiding mechanism is described in more detail below (note that description pertaining the display/collimating optics 15/17 applies equally to both the left display/optics 15L/17L and to the right display 15R/17R). The left and right images may be different to one another in a manner such that a stereoscopic image is perceived by the wearer, i.e. to create an illusion of depth. The left display (15L) and associated collimating optics (17L) (respective right display 15R and associated collimating optics 17R) constitute a set of left imaging components (respective right imaging components).

The wearer's ears are not shown in FIG. 2B, however as will be apparent, parts (90L, 90R) of the left and right extensions (6L, 6R) fit over and are supported by the wearer's left and right ears respectively so that the optical components (10L, 10R) are supported forward of the user's left and right eyes respectively in the manner of conventional spectacle lenses, with the central portion (4) fitting over the nose bridge of the wearer.

Other headpieces are also within the scope of the subject matter. For instance, the display optics can equally be attached to the users head using a head band, helmet or other fit system. The purpose of the fit system is to support the display and provide stability to the display and other head borne systems such as tracking systems and cameras. The fit system will also be designed to meet user population in anthropometric range and head morphology and provide comfortable support of the display system. The light engines 17L, 17R may be mounted to a central portion of any such headpiece so that they sit centrally relative to the user when the headpiece is worn, and not at the user's temples.

Known types of head-mounted display systems tend to locate imaging components to the side of the frame so that they sit near to the user's temple. This is thought to improve the wearability of the device as this is generally seen to be the least obtrusive location.

However, the inventors have recognized that, for a stereoscopic imaging system, misalignment of a stereoscopic image pair can occur with even slight changes in the relative position of the left and right optical imaging components. Such changes can arise from transient deflection of the frame through normal use as a result of mechanical or thermal effects, long term deflection though wear and tear, or other reasons causing misalignment. Even slight changes can introduce a level of binocular disparity between the left and right images to which the human visual system (HVS) is highly sensitive, to the extent that even relatively short-term exposure to even a small level of binocular disparity can make the wearer feel quite unwell. The HVS is particular sensitive to vertical disparity between the left and right images, and even a misalignment of the images by an amount corresponding to as little one pixel can be perceptible depending on the display resolution.

The inventors have recognized that in systems, where the left and right imaging components are located far away from each other, on the sides of the frames, maintaining this level of angular alignment between the left and right components would be impracticable. One way this could be achieved in theory is to make the portion of the frame between the left and right components sufficiently rigid. However, in practice it is unlikely that the necessary tolerances to maintain binocular parity could be held, and in any event including any such structure in the system would significantly increase manufacturing costs.

The inventors have recognized that were the left and right imaging components to be located to the left and right of the display system maintaining this level of angular alignment between the left and right components would be impracticable. One way this could be achieved, in theory, is to make the portion of the frame between the left and right components sufficiently rigid. However, in practice it is unlikely that the necessary tolerances to maintain binocular parity could be held, and in any event including any such structure in the system would significantly increase manufacturing costs.

In the display system disclosed herein, the left and right displays are housed adjacent one another in the central portion (4) of the frame (6). The central portion (4) forms a housing, which houses both of the displays (15L, 15R) as well as their respective associated collimating optics (17L, 17R).

Collocating both the left and right imaging component (15L/17L, 15R/17R) in this manner ensures that any thermal disturbances affect both the first and second images equally and in the same manner (which is acceptable as binocular disparity only results if they are perturbed differently to one another). Thus, collocating the left and right components (15L/17L, 15R/17R) substantially eliminates any binocular disparity which would otherwise occur due to thermal fluctuations, with the centrality of the location ensuring each is able to cooperate as intended with the respective optical component (10L, 10R).

Collocating the imaging components (15L/17L, 15R/17R) also means that mechanical perturbations are less likely to introduce disparity, e.g. twisting or bending of the frame (6) is less likely to introduce disparity when these components are centrally located as compared with locating them at the sides of the frame.

Although not shown explicitly in FIG. 2B, the imaging component (15L/17L, 15R/17R) are supported in the central portion (4) in a rigid formation by a rigid support structure, for example a carbon fibre support structure, which is significantly more rigid than the frame (6). Carbon fibre is just an example and other low mass rigid materials could be used, e.g. titanium. Supporting both the left and right imaging component in the same highly rigid structure maintains a precise relative alignment between the left imaging components (15L/17L) and the right imaging components (15R/17R) even in the presence of significant mechanical perturbations. Even if the imaging components move relative to the frame (6) and in particular relative to the optical components (10L, 10R), binocular parity is maintained because rigidity of the support structure keeps the imaging components (15L/17L) and (15R/17R) in a substantially fixed arrangement relative to one another.

Because the left and right imaging components (15L/17L) and (15R/17R) are all located near to one another, the rigid support structure can be small in size, i.e. requiring a significantly smaller amount of rigid material that if the left and right imaging components were to be located at the sides of the frame instead. This significantly reduces the cost of manufacturing the display system.

Figure 3A:
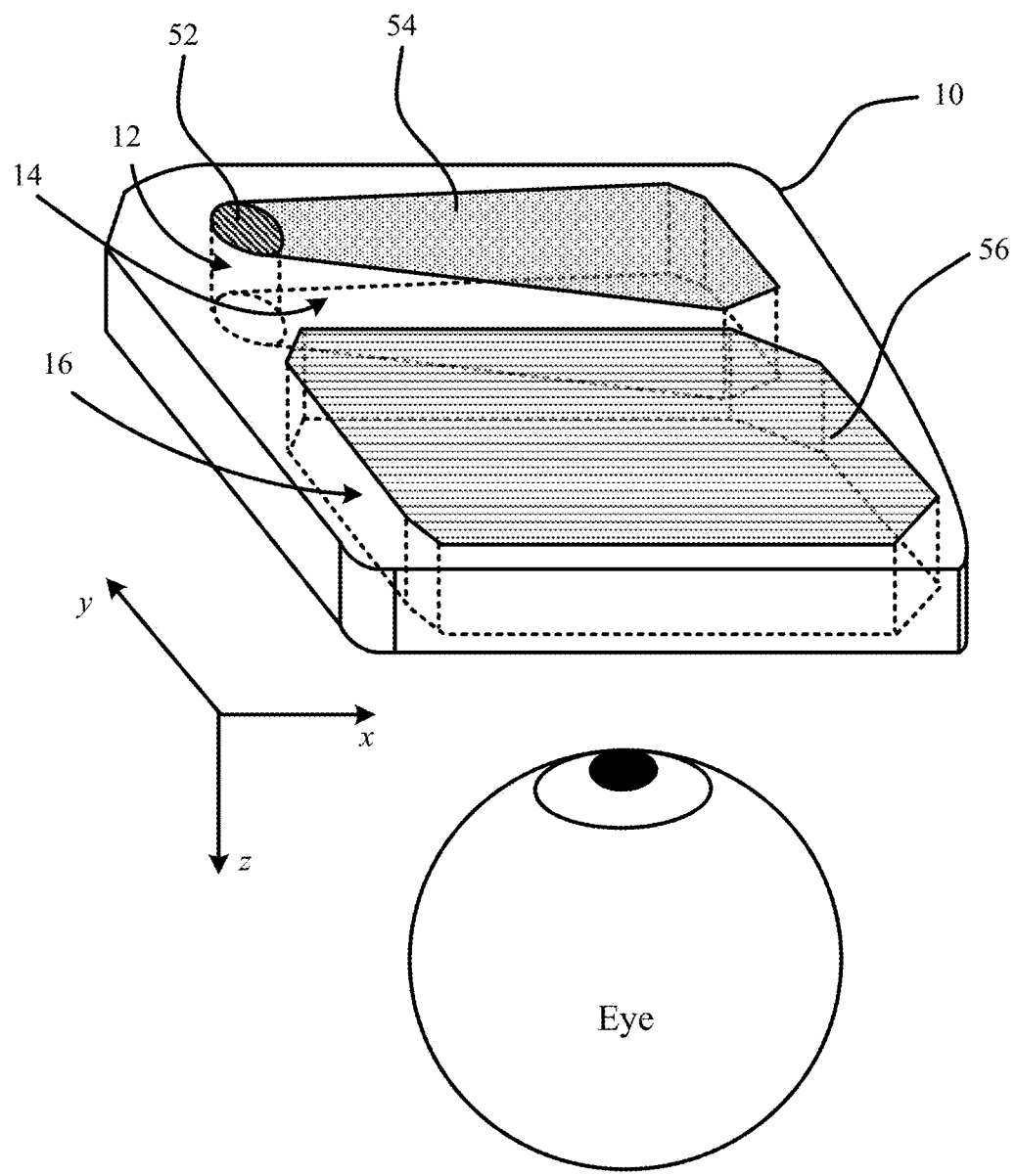
FIGS. 3A and 3B shows perspective and frontal view of an optical component.
Figure 3B:
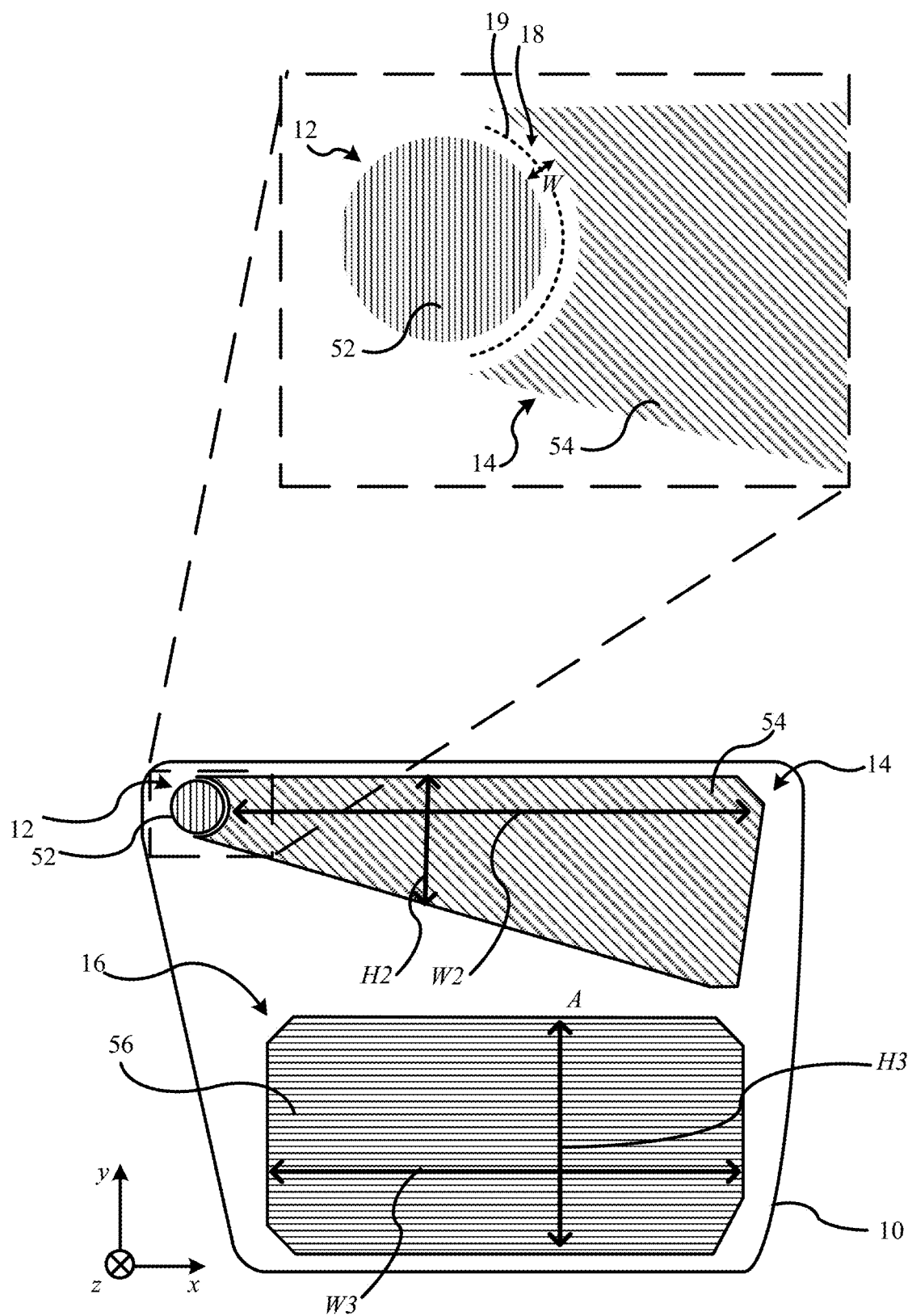

FIGS. 3A and 3B show an optical component in more detail.

FIG. 3A shows a perspective view of a waveguide optical component (10). The optical component is flat in that the front and rear portions of its surface are substantially flat (front and rear defined from the viewpoint of the wearer, as indicated by the location of the eye in FIG. 3A). The front and rear portions of the surface are parallel to one another. The optical component (10) lies substantially in a plane (xy-plane), with the z axis (referred to as the "normal") directed towards the viewer from the optical component (10). The incoupling, fold and exit zones (12, 14 and 16) are shown, each defined by respective surface modulations (52, 46 and 56) on the surface of the optical component, which are on the rear of the waveguide from a viewpoint of the wearer. Each of the surface modulations (52, 46, 56) forms a respective surface relief grating (SRG), the nature of which will be described shortly. Instead of the SRGs, holograms could be used providing the same optical function as the SRGs.

As shown in the plan view of FIG. 3B, the fold zone has a horizontal extent (W2) (referred to herein as the "width" of the expansion zone) in the lateral (x) direction and an extent (H2) in the vertical (y) direction (referred to herein as the "height" of the expansion zone) which increases from the inner edge of the optical component to its outer edge in the lateral direction along its width (W2). The exit zone has a horizontal extent (W3) (width of the exit zone) and y-direction extent (H3) (height of the exit zone) which define the size of the eye box. The eyebox's size is independent of the imaging optics in the light engine. The incoupling and fold SRGs (52, 54) have a relative orientation angle A, as do the fold and exit SRGs (54, 56) (note the various dotted lines superimposed on the SRGs 52, 54, 56 in FIG. 9B described below denote directions perpendicular to the grating lines of those SRGs).

The incoupling and fold zones (12, 14) are substantially contiguous in that they are separated by at most a narrow border zone (18) which has a width (W) as measured along (that is, perpendicular to) a common border (19) that divides the border zone (18). The common border (19) is arcuate (substantially semi-circular in this example), the incoupling and fold regions (12, 14) having edges which are arcuate (substantially semi-circular) along the common border (19). The edge of the incoupling region (12) is substantially circular overall.

Principles of the diffraction mechanisms which underlie operation of the head mounted display described herein will now be described with reference to FIGS. 4A and 4B.

The optical components described herein interact with light by way of reflection, refraction and diffraction. Diffraction occurs when a propagating wave interacts with a structure, such as an obstacle or slit. Diffraction can be described as the interference of waves and is most pronounced when that structure is comparable in size to the wavelength of the wave. Optical diffraction of visible light is due to the wave nature of light and can be described as the interference of light waves. Visible light has wavelengths between approximately 390 and 700 nanometers (nm) and diffraction of visible light is most pronounced when propagating light encounters structures of a similar scale e.g. of order 100 or 1000 nm in scale.

One example of a diffractive structure is a periodic (substantially repeating) diffractive structure. Herein, a "diffraction grating" means any (part of) an optical component which has a periodic diffractive structure. Periodic structures can cause diffraction of light, which is typically most pronounced when the periodic structure has a spatial period of similar size to the wavelength of the light. Types of periodic structures include, for instance, surface modulations on the surface of an optical component, refractive index modulations, holograms etc. When propagating light encounters the periodic structure, diffraction causes the light to be split into multiple beams in different directions. These directions depend on the wavelength of the light thus diffractions gratings cause dispersion of polychromatic (e.g. white) light, whereby the polychromatic light is split into different coloured beams travelling in different directions.

When the periodic structure is on the surface of an optical component, it is referred to a surface grating. When the periodic structure is due to modulation of the surface itself, it is referred to as a surface relief grating (SRG). An example of a SRG is uniform straight grooves in a surface of an optical component that are separated by uniform straight groove spacing regions. Groove spacing regions are referred to herein as "lines", "grating lines" and "filling regions". The nature of the diffraction by a SRG depends both on the wavelength of light incident on the grating and various optical characteristics of the SRG, such as line spacing, groove depth and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mould for manufacturing further optical components.

An SRG is an example of a Diffractive Optical Element (DOE). When a DOE is present on a surface (e.g. when the DOE is an SRG), the portion of that surface spanned by that DOE is referred to as a DOE area.

Figure 4A:
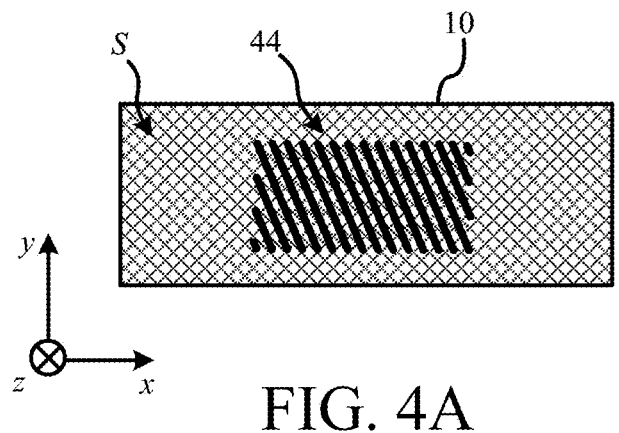
FIG. 4A shows a schematic plan view of an optical component having a surface relief grating formed on its surface.
Figure 4B:
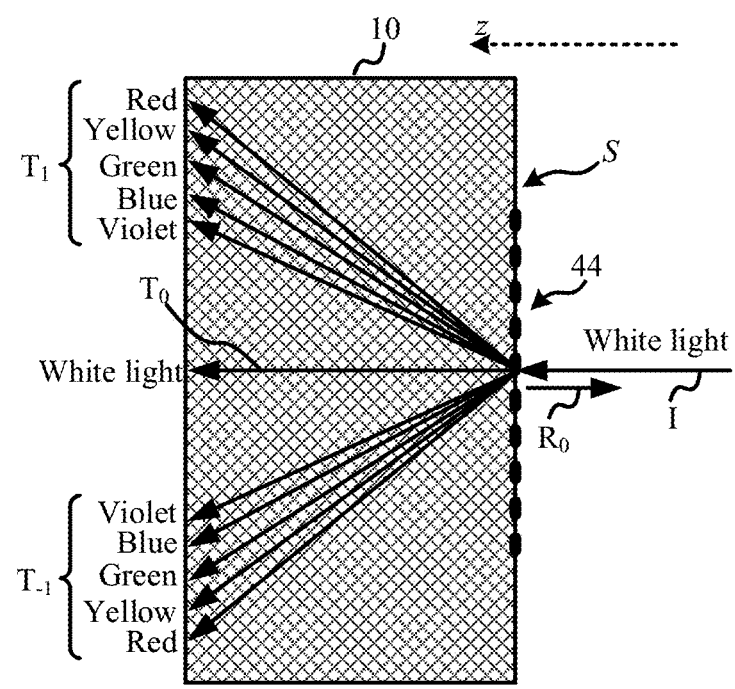
FIG. 4B shows a schematic illustration of the optical component of FIG. 4A, shown interacting with incident light and viewed from the side.

FIGS. 4A and 4B show from the top and the side respectively part of a substantially transparent optical component (10) having an outer surface (S). At least a portion of the surface S exhibits surface modulations that constitute a SRG (44) (e.g. 52, 54, 56), which is a microstructure. Such a portion is referred to as a "grating area". The modulations comprise grating lines which are substantially parallel and elongate (substantially longer than they are wide), and also substantially straight in this example (though they need not be straight in general).

FIG. 4B shows the optical component (10), and in particular the SRG (44), interacting with an incoming illuminating light beam I that is inwardly incident on the SRG (44). The incident light (I) is white light in this example, and thus has multiple colour components. The light (I) interacts with the SRG (44) which splits the light into several beams directed inwardly into the optical component (10). Some of the light (I) may also be reflected back from the surface (S) as a reflected beam (R0). A zero-order mode inward beam (T0) and any reflection (R0) are created in accordance with the normal principles of diffraction as well as other non-zero-order (in-order) modes (which can be explained as wave interference). FIG. 4B shows first-order inward beams (T1, T−1); it will be appreciated that higher-order beams may or may not also be created depending on the configuration of the optical component (10). Because the nature of the diffraction is dependent on wavelength, for higher-order modes, different colour components (i.e. wavelength components) of the incident light (I) are, when present, split into beams of different colours at different angles of propagation relative to one another as illustrated in FIG. 4B.

Figure 5A:
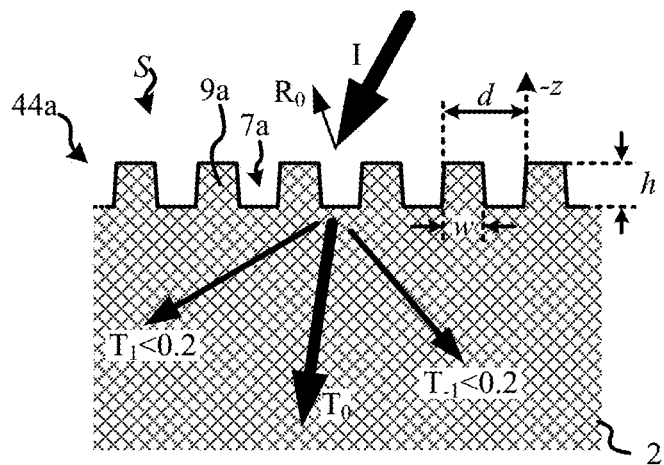
FIG. 5A shows a schematic illustration of a straight binary surface relief grating, shown interacting with incident light and viewed from the side.
Figure 5B:
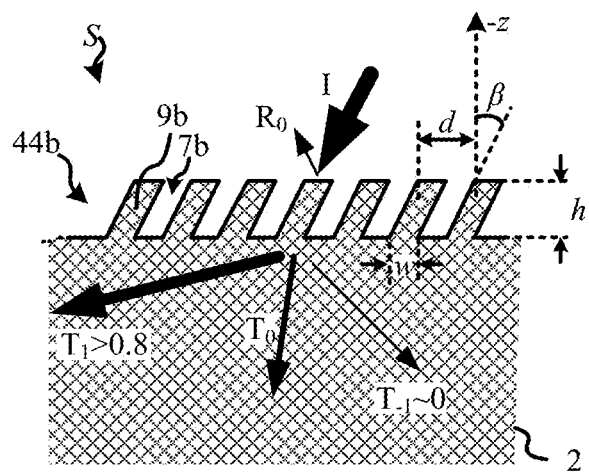
FIG. 5B shows a schematic illustration of a slanted binary surface relief grating, shown interacting with incident light and viewed from the side.
Figure 5C:
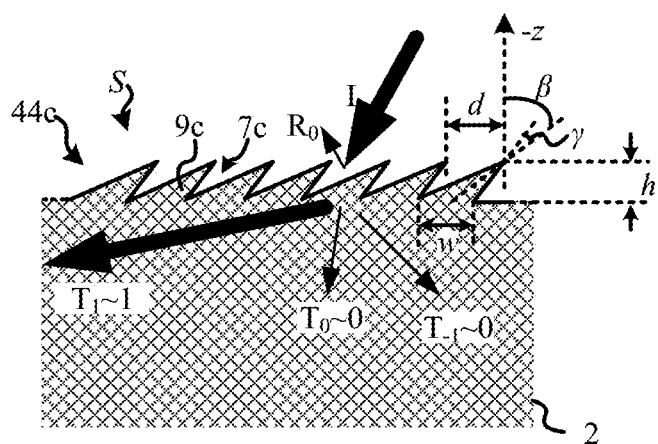
FIG. 5C shows a schematic illustration of an overhanging triangular surface relief grating, shown interacting with incident light and viewed from the side.

FIGS. 5A-5C are close-up schematic cross sectional views of different exemplary SRGs 44a-44c (collectively referenced as 44 herein) that may be formed by modulation of the surface S of the optical component 10 (which is viewed from the side in these figures). Light beams are denoted as arrows whose thicknesses denote approximate relative intensity (with higher intensity beams shown as thicker arrows).

FIG. 5A shows an example of a straight binary SRG (44a). The straight binary SRG (44a) is formed of a series of grooves (7a) in the surface (S) separated by protruding groove spacing regions (9a) which are also referred to herein as "filling regions", "grating lines" or simply "lines". The SRG (44a) has a spatial period of d (referred to as the "grating period"), which is the distance over which the modulations' shape repeats and which is thus the distance between adjacent lines/grooves. The grooves (7a) have a depth (h) and have substantially straight walls and substantially flat bases. The filling regions have a height (h) and a width that is substantially uniform over the height (h) of the filling regions, labelled "w" in FIG. 5A (with w being some fraction f of the period: w=f*d).

For a straight binary SRG, the walls are substantially perpendicular to the surface (S). For this reason, the SRG (44a) causes symmetric diffraction of incident light (I) that is entering perpendicularly to the surface, in that each +n-order mode beam (e.g. T1) created by the SRG (4a) has substantially the same intensity as the corresponding −n-order mode beam (e.g. T−1), typically less than about one fifth (0.2) of the intensity of the incident beam (I).

FIG. 5B shows an example of a slanted binary SRG (44b). The slanted binary SRG (44b) is also formed of grooves, labelled 7b, in the surface (S) having substantially straight walls and substantially flat bases separated by lines (9b) of width (w). However, in contrast to the straight SRG (44a), the walls are slanted by an amount relative to the normal, denoted by the angle β in FIG. 5B. The grooves (7b) have a depth (h) as measured along the normal. Due to the asymmetry introduced by the non-zero slant, ±n-order mode inward beams travelling away from the slant direction have greater intensity that their ∓n-order mode counterparts (e.g. in the example of FIG. 5B, the T1 beam is directed away from the direction of slant and has usually greater intensity than the T−1 beam, though this depends on e.g. the grating period d); by increasing the slant by a sufficient amount, those ∓n counterparts can be substantially eliminated (i.e. to have substantially zero intensity). The intensity of the T0 beam is typically also very much reduced by a slanted binary SRG such that, in the example of FIG. 5B, the first-order beam T1 typically has an intensity of at most about four fifths (0.8) the intensity of the incident beam (I).

The binary SRGs (44a) and (44b) can be viewed as spatial waveforms embedded in the surface (S) that have a substantially square wave shape (with period d). In the case of the SRG (44b), the shape is a skewed square wave shape skewed by β.

FIG. 5C shows an example of an overhanging triangular SRG (44c) which is a special case of an overhanging trapezoidal SRG. The triangular SRG (44c) is formed of grooves (7c) in the surface (S) that are triangular in shape (and which thus have discernible tips) and which have a depth (h) as measured along the normal. Filling regions (9c) take the form of triangular, tooth-like protrusions (teeth), having medians that make an angle β with the normal (β being the slant angle of the SRG 44c). The teeth have tips that are separated by (d) (which is the grating period of the SRG 44c), a width that is (w) at the base of the teeth and which narrows to substantially zero at the tips of the teeth. For the SRG (44c) of FIG. 5C, w≈d, but generally can be w<d. The SRG is overhanging in that the tips of the teeth extend over the tips of the grooves. It is possible to construct overhanging triangular SRGs that substantially eliminate both the zero order transmission-mode (T0) beam and the ∓n-mode beams, leaving only ±n-order mode beams (e.g. only T1). The grooves have walls which are at an angle γ to the median (wall angle).

The SRG (44c) can be viewed as a spatial waveform embedded in (S) that has a substantially triangular wave shape, which is skewed by β.

Other SRGs are also possible, for example other types of trapezoidal SRGs (which may not narrow in width all the way to zero), sinusoidal SRGs etc. Such other SRGs also exhibit depth (h), linewidth (w), slant angle β and wall angles γ which can be defined in a similar manner to FIG. 5A-C.

In the present display system, d is typically between about 250 and 500 nm, and h between about 30 and 400 nm. The slant angle β is typically between about 0 and 45 degrees (such that slant direction is typically elevated above the surface (S) by an amount between about 45 and 90 degrees).

An SRG has a diffraction efficiency defined in terms of the intensity of desired diffracted beam(s) (e.g. T1) relative to the intensity of the illuminating beam (I), and can be expressed as a ratio (η) of those intensities. As will be apparent from the above, slanted binary SRGs can achieve higher efficiency (e.g. 4b—up to η≈0.8 if T1 is the desired beam) than non-slanted SRGs (e.g. 44a—only up to about η≈0.2 if T1 is the desired beam). With overhanging triangular SRGs, it is possible to achieve near-optimal efficiencies of η≈1.

Returning to FIGS. 3A and 3B, it can be seen that the incoupling, fold and exit zones (12, 14, 16) are diffraction gratings whose periodic structure arises due to the modulations (52, 54, 56) of the optical component's surface that form the incoupling, fold and exit SRGs respectively, and which cover the incoupling, fold and exit zones 12, 14, 16 respectively.

Figure 6:
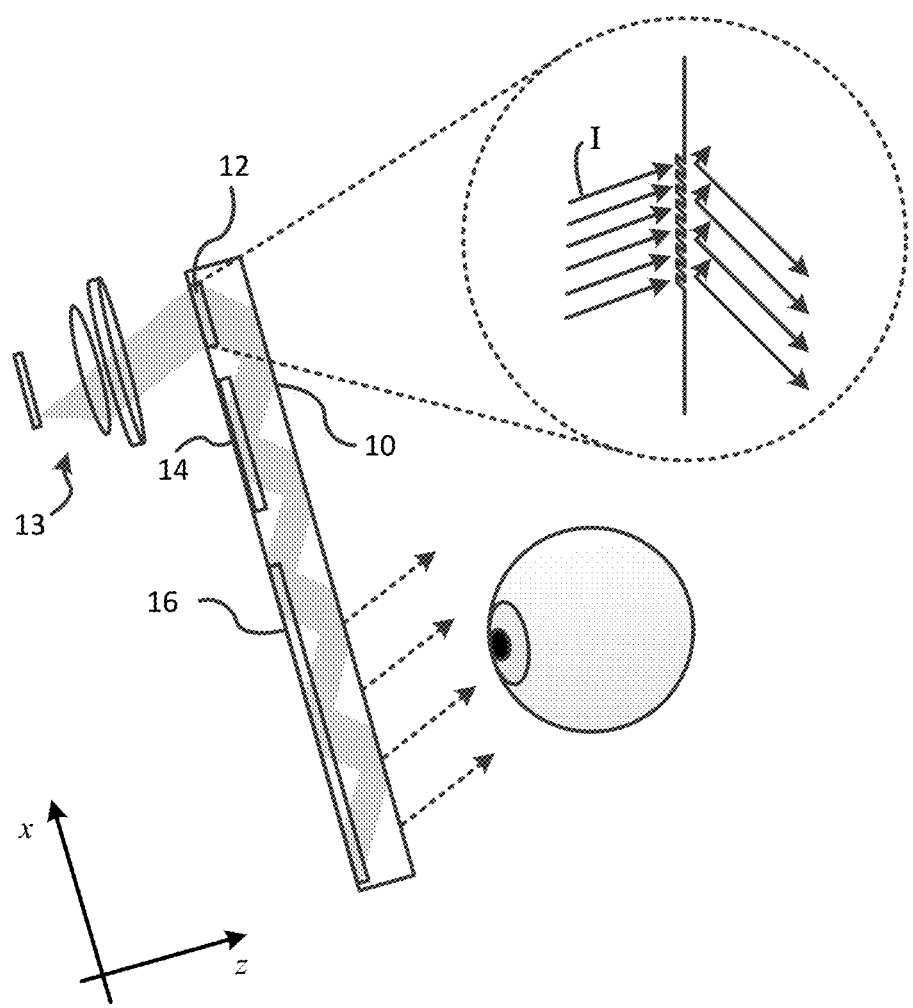
FIG. 6 shows a close up view of part of an incoupling zone of an optical component.

FIG. 6 shows the incoupling SRG (52) with greater clarity, including an expanded version showing how the light beam interacts with it. FIG. 6 shows a plan view of the optical component (10). The light engine (13) provides beams of collimated light, one of which is shown (corresponding to a display pixel). That beam falls on the incoupling SRG (52) and thus causes total internal reflection of the beam in the component (10). The intermediate grating (14) directs versions of the beams down to the exit grating (16), which causes diffraction of the image onto the user's eye. The operation of the grating (12) is shown in more detail in the expanded portion which shows rays of the incoming light beam coming in from the left and denoted (I) and those rays being diffracted so as to undergo TIR in the optical component (10). The grating in FIG. 6 is of the type shown in FIG. 5B but could also be of the type shown in FIG. 5C or some other slanted grating shape.

Optical principles underlying certain embodiments will now be described with reference to FIGS. 7A-9B.

Collimating optics of the display system are arranged to substantially collimate an image on a display of the display system into multiple input beams. Each beam is formed by collimating light from a respective image point, that beam directed to the incoupling zone in a unique inward direction which depends on the location of that point in the image. The multiple input beams thus form a virtual version of the image. The intermediate and exit zones have widths substantially larger than the beams' diameters. The incoupling zone is arranged to couple each beam into the intermediate zone, in which that beam is guided onto multiple splitting regions of the intermediate zone in a direction along the width of the intermediate zone. The intermediate zone is arranged to split that beam at the splitting regions to provide multiple substantially parallel versions of that beam. Those multiple versions are coupled into the exit zone, in which the multiple versions are guided onto multiple exit regions of the exit zone. The exit regions lie in a direction along the width of the exit zone. The exit zone is arranged to diffract the multiple versions of that beam outwardly, substantially in parallel and in an outward direction which substantially matches the unique inward direction in which that beam was incoupled. The multiple input beams thus cause multiple exit beams to exit the waveguide which form substantially the same virtual version of the image.

Figure 7A:
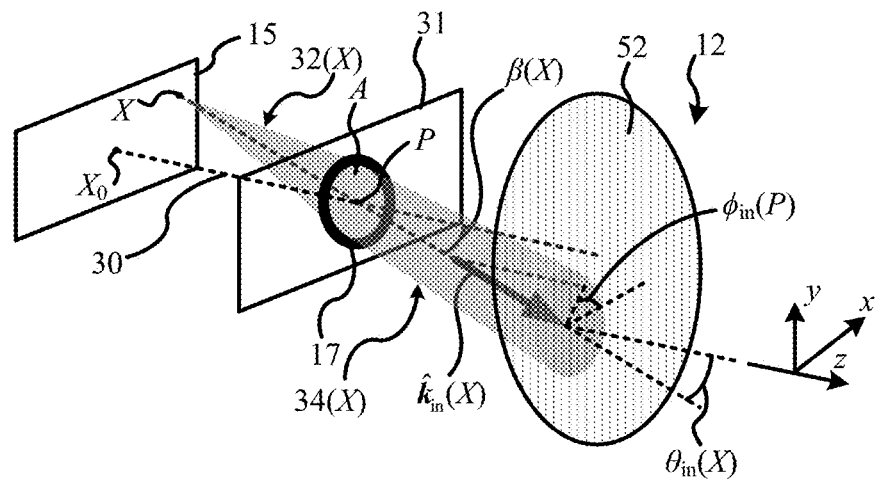
FIG. 7A shows a perspective view of a part of a display system.

FIG. 7a shows a perspective view of the display (15), imaging optics (17) and incoupling SRG (52). Different geometric points on the region of the display (15) on which an image is displayed are referred to herein as image points, which may be active (currently emitting light) or inactive (not currently emitting light). In practice, individual pixels can be approximated as image points.

The imaging optics (17) can typically be approximated as a principal plane (thin lens approximation) or, in some cases, more accurately as a pair of principal planes (thick lens approximation) the location(s) of which are determined by the nature and arrangement of its constituent lenses. In these approximations, any refraction caused by the imaging optics (17) is approximated as occurring at the principal plane(s). To avoid unnecessary complication, principles of various embodiments will be described in relation to a thin lens approximation of the imaging optics (17), and thus in relation to a single principal plane labelled 31 in FIG. 7a, but it will be apparent that more complex imaging optics that do not fit this approximation still can be utilized to achieve the desired effects.

The imaging optics (17) has an optical axis (30) and a front focal point, and is positioned relative to the optical component (10) so that the optical axis (30) intersects the incoupling SRG (52) at or near the geometric centre of the incoupling SRG (52) with the front focal point lying substantially at an image point $X_0$ on the display (that is, lying in the same plane as the front of the display). Another arbitrary image point X on the display is shown, and principles underlying various embodiments will now be described in relation to X without loss of generality. In the following, the terminology "for each X" or similar is used as a convenient shorthand to mean "for each image point (including X)" or similar, as will be apparent in context.

When active, image points—including the image point labelled X and $X_0$—act as individual illumination point sources from which light propagates in a substantially isotropic manner through the half-space forward of the display (15). Image points in areas of the image perceived as lighter emit light of higher intensity relative to areas of the image perceived as darker. Image points in areas perceived as black emit no or only very low intensity light (inactive image points). The intensity of the light emitted by a particular image point may change as the image changes, for instance when a video is displayed on the display (15).

Each active image point provides substantially uniform illumination of a collimating area (A) of the imaging optics (17), which is substantially circular and has a diameter (D) that depends on factors such as the diameters of the constituent lenses (typically D is of order 1-10 mm). This is illustrated for the image point X in FIG. 7a, which shows how any propagating light within a cone 32(X) from X is incident on the collimating area A. The imaging optics collimates any light 32(X) incident on the collimating area A to form a collimated beam 34(X) of diameter D (input beam), which is directed towards the incoupling grating (52) of the optical component (10). The beam 34(X) is thus incident on the incoupling grating (52). A shielding component (not shown) may be arranged to prevent any uncollimated light from outside of the cone 32(X) that is emitted from X from reaching the optical component (10).

The beam 34(X) corresponding to the image point X is directed in an inward propagation direction towards the incoupling SRG (52), which can be described by a propagation vector $\hat{\mathbf{k}}_{in}(X)$ (herein, bold typeface is used to denote 3-dimensional vectors, with hats on such vectors indicating denoting a unit vector). The inward propagation direction depends on the location of X in the image and, moreover, is unique to X. That unique propagation direction can be parameterized in terms of an azimuthal angle $\phi_{in}(X)$ (which is the angle between the x-axis and the projection of $\hat{\mathbf{k}}_{in}(X)$ in the xy-plane) and a polar angle $\theta_{in}(X)$ (which is the angle between the z-axis and $\hat{\mathbf{k}}_{in}(P)$ as measured in the plane in which both the z-axis and $\hat{\mathbf{k}}_{in}(X)$ lie—note this is not the xz-plane in general). The notation $\phi_{in}(X)$, $\theta_{in}(X)$ is adopted to denote the aforementioned dependence on X; as indicated $\phi_{in}(X)$, $\theta_{in}(X)$ are unique to that X. Note that, herein, both such unit vectors and such polar/azimuthal angle pairs parameterizing such vectors are sometimes referred herein to as "directions" (as the latter represent complete parameterizations thereof), and that sometimes azimuthal angles are referred to in isolation as xy-directions for the same reason. Note further that "inward" is used herein to refer to propagation that is towards the waveguide (having a positive z-component when propagation is towards the rear of the waveguide as perceived by the viewer and a negative z-component when propagation is towards the front of the waveguide).

The imaging optics has a principle point P, which is the point at which the optical axis (30) intersects the principal plane (31) and which typically lies at or near the centre of the collimation area (A). The inward direction $\hat{\mathbf{k}}_{in}(X)$ and the optical axis 30 have an angular separation $\beta(X)$ equal to the angle subtended by X and $X_0$ from P. $\beta(X)=\theta_{in}(X)$ if the optical axis is parallel to the z-axis (which is not necessarily the case).

As will be apparent, the above applies for each active image point and the imaging optics is thus arranged to substantially collimate the image, which is currently on the display (15), into multiple input beams, each corresponding to and propagating in a unique direction determined by the location of a respective active image point (active pixel in practice). That is, the imaging optics (17) effectively converts each active point source (X) into a collimated beam in a unique inward direction $\hat{\mathbf{k}}_{in}(X)$. As will be apparent, this can be equivalently stated as the various input beams for all the active image points forming a virtual image at infinity that corresponds to the real image that is currently on the display (15). A virtual image of this nature is sometimes referred to herein as a virtual version of the image (or similar).

The input beam corresponding to the image point $X_0$ (not shown) would propagate parallel to the optical axis (30), towards or near the geometric centre of the incoupling SRG (52).

Figure 7B:
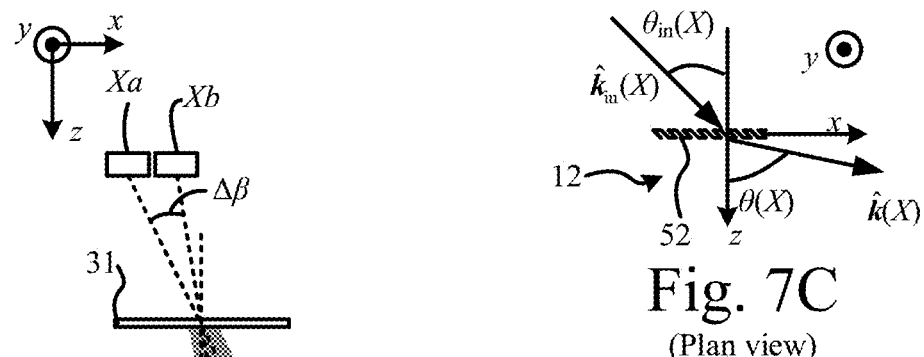
FIG. 7B shows a plan view of individual pixels of a display.

As mentioned, in practice, individual pixels of the display (15) can be approximated as single image points. This is illustrated in FIG. 7B which is a schematic plan view showing the principal plane (31) and two adjacent pixels (Xa, Xb) of the display (15), whose centres subtend an angle $\Delta\beta$ from the principal point P. Light emitted the pixels (Xa, Xb) when active is effectively converted into collimated beams 34(Xa), 34(Xb) having an angular separation equal to $\Delta\beta$. As will be apparent, the scale of the pixels (Xa, Xb) has been greatly enlarged for the purposes of illustration.

The beams are highly collimated, having an angular range no greater than the angle subtended by an individual pixel from P ($\sim\Delta\beta$), e.g. typically having an angular range no more than about ½ milliradian. As will become apparent in view of the following, this increases the image quality of the final image as perceived by the wearer.

Figure 7C:
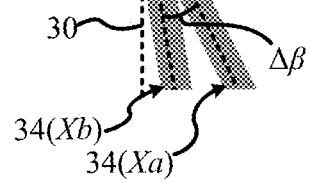
FIGS. 7C and 7D show plan and frontal views of a beam interacting with an optical component.
Figure 7D:
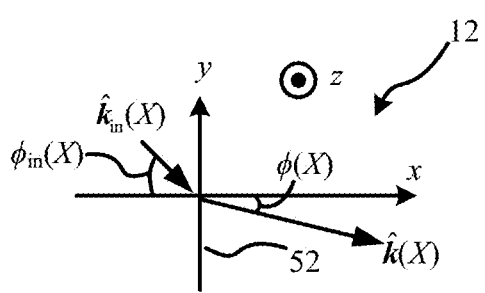

FIGS. 7C and 7D show schematic plan (xz) and frontal (yz) views of part of the optical component respectively. As indicated in these figures, the incoupling grating (52) causes diffraction of the beam 34(X) thereby causing a first (±1) order mode beam to propagate within the optical component (10) in a new direction $\hat{\mathbf{k}}(X)$ that is generally towards the fold SRG (54) (i.e. that has a positive x-component). The new direction $\hat{\mathbf{k}}(X)$ can be parameterized by azimuthal and polar angles $\phi(X)$—where $|\phi(X)|\leq|\phi_{in}(X)|$ and $\theta(X)$—where $|\theta(X)|>|\theta_{in}(X)|$—which are also determined by the location of and unique to the image point X. The grating (52) is configured so that the first order mode is the only significant diffraction mode, with the intensity of this new beam thus substantially matching that of the input beam. As mentioned above, a slanted grating can be used to achieve this desired effect (the beam as directed away from the incoupling SRG (52) would correspond, for instance, to beam T1 as shown in FIG. 4B or 4C). In this manner, the beam 34(X) is coupled into the incoupling zone (12) of the optical component (10) in the new direction $\hat{\mathbf{k}}(X)$.

The optical component has a refractive index n and is configured such that the polar angle $\theta(X)$ satisfies total internal reflection criteria given by:

$$\sin \theta(X) > 1/n \text{ for each } X. \quad (1):$$

As will be apparent, each beam input from the imaging optics (17) thus propagates through the optical component (10) by way of total internal reflection (TIR) in a generally horizontal (+x) direction (offset from the x-axis by $\phi(X)<\phi_{in}(X)$). In this manner, the beam 34(X) is coupled from the incoupling zone (12) into the fold zone (14), in which it propagates along the width of the fold zone (14).

Figure 7F:
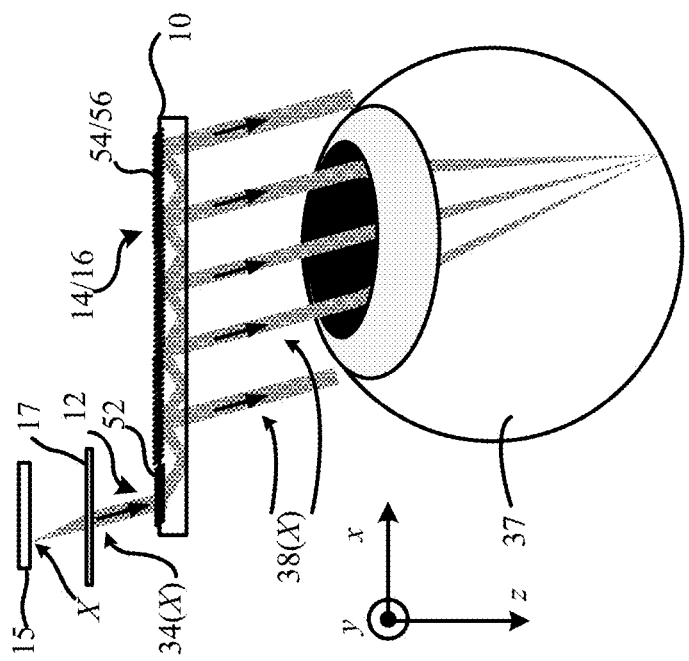
FIG. 7F shows a plan view of an optical component performing beam expansion.
Figure 7E:
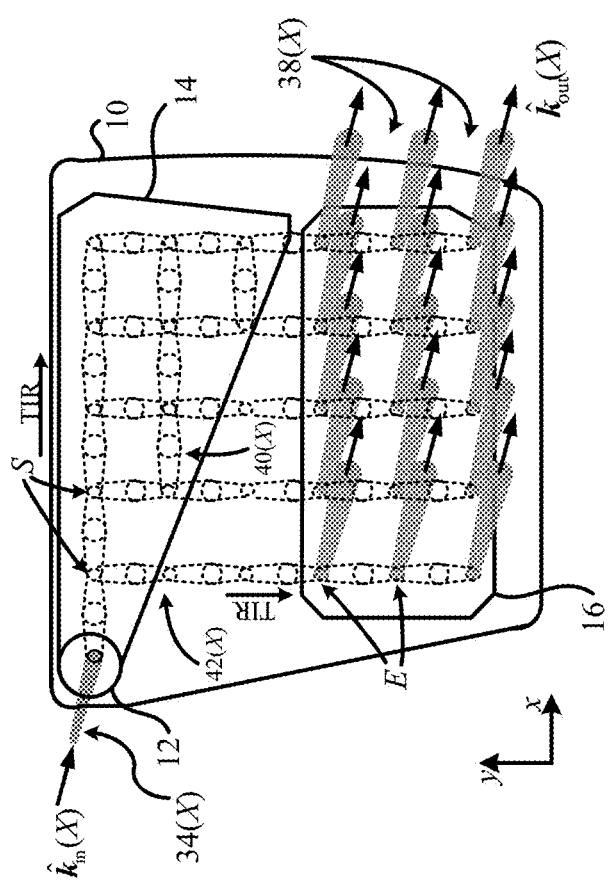
FIG. 7E shows a frontal view of an optical component performing beam expansion.

FIG. 7E shows a frontal (xy) view of the whole of the optical component (10), from a viewpoint similar to that of the wearer. As explained in more detail below, a combination of diffractive beam splitting and total internal reflection within the optical component (10) results in multiple versions of each input beam 34(X) being outwardly diffracted from the exit SRG along both the length and the width of the exit zone (16) as output beams 38(X) in respective outward directions (that is, away from the optical component 10) that substantially match the respective inward direction $\hat{\mathbf{k}}_{in}(X)$ of the corresponding input beam 34(X).

In FIG. 7E, beams external to the optical component (10) are represented using shading and dotted lines are used to represent beams within the optical component 10. Perspective is used to indicate propagation in the z-direction, with widening (resp. narrowing) of the beams in FIG. 7E representing propagation in the positive (resp. negative) z direction; that is towards (resp. away from) the wearer. Thus, diverging dotted lines represent beams within the optical component (10) propagating towards the front wall of the optical component (10); the widest parts represent those beams striking the front wall of the optical component 10, from which they are totally internally reflected back towards the rear wall (on which the various SRGs are formed), which is represented by the dotted lines converging from the widest points to the narrowest points at which they are incident on the rear wall. Regions where the various beams are incident on the fold and exit SRGs are labelled S and E and termed splitting and exit regions respectively for reasons that will become apparent.

As illustrated, the input beam 34(X) is coupled into the waveguide by way of the aforementioned diffraction by the incoupling SRG (52), and propagates along the width of the incoupling zone (12) by way of TIR in the direction $\phi(X)$, $\pm\theta(X)$ (the sign but not the magnitude of the polar angle changing whenever the beam is reflected). As will be apparent, this results in the beam 34(X) eventually striking the fold SRG at the left-most splitting region (S).

When the beam 34(X) is incident at a splitting region (S,) that incident beam 34(X) is effectively split in two by way of diffraction to create a new version of that beam 42(X) (specifically a −1 reflection mode beam) which directed in a specific and generally downwards (−y) direction $\phi'(X)$, $\pm\theta'(X)$ towards the exit zone (16) due to the fold SRG (54) having a particular configuration which will be described in due course, in addition to a zero order reflection mode beam (specular reflection beam), which continues to propagate along the width of the beam in the same direction $\phi(X)$, $\pm\theta(X)$ just as the beam 34(X) would in the absence of the fold SRG (albeit at a reduced intensity). Thus, the beam 34(X) effectively continues to propagate along substantially the whole width of the fold zone (14), striking the fold SRG at various splitting regions (S), with another new version of the beam (in the same specific downward direction $\phi'(X)$, $\pm\theta'(X)$) created at each splitting region (S). As shown in FIG. 7E, this results in multiple versions of the beam 34(X) being coupled into the exit zone (16), which are horizontally separated so as to collectively span substantially the width of the exit zone (16).

As also shown in FIG. 7E, a new version 42(X) of the beam as created at a splitting region (S) may itself strike the fold SRG during its downward propagation. This will result in a zero order mode being created which continues to propagate generally downwards in the direction $\phi'(X)$, $\pm\theta'(X)$ and which can be viewed as continued propagation of that beam, but may also result in a non-zero order mode beam 40(X) (further new version) being created by way of diffraction. However, any such beam 40(X) created by way of such double diffraction at the same SRG will propagate in substantially the same direction $\phi(X)$, $\pm\theta(X)$ along the width of the fold zone (14) as the original beam 34(X) as coupled into the optical component (10) (see below). Thus, notwithstanding the possibility of multiple diffractions by the fold SRG, propagation of the various versions of the beam 34(X) (corresponding to image point X) within the optical component (10) is effectively limited to two xy-directions: the generally horizontal direction ($\phi(X)$, $\pm\theta(X)$), and the specific and generally downward direction ($\phi'(X)$, $\pm\theta'(X)$) that will be discussed shortly.

Propagation within the fold zone (14) is thus highly regular, with all beam versions corresponding to a particular image point X substantially constrained to a lattice like structure in the manner illustrated.

The exit zone (16) is located below the fold zone (14) and thus the downward-propagating versions of the beam 42(X) are coupled into the exit zone (16), in which they are guided onto the various exit regions (E) of the output SRG. The exit SRG (56) is configured so as, when a version of the beam strikes the output SRG, that beam is diffracted to create a first order mode beam directed outwardly from the exit SRG (56) in an outward direction that substantially matches the unique inward direction in which the original beam 34(X) corresponding to image point X was inputted. Because there are multiple versions of the beam propagating downwards that are substantially span the width of the exit zone (16), multiple output beams are generated across the width of the exit zone (16) (as shown in FIG. 7E) to provide effective horizontal beam expansion.

Moreover, the exit SRG (56) is configured so that, in addition to the outwardly diffracted beams 38(X) being created at the various exit regions (E) from an incident beam, a zero order diffraction mode beam continuous to propagate downwards in the same specific direction as that incident beam. This, in turn, strikes the exit SRG at a lower exit zone (16) in the manner illustrated in FIG. 7E, resulting in both continuing zero-order and outward first order beams. Thus, multiple output beams 38(X) are also generated across substantially the width of the exit zone (16) to provide effective vertical beam expansion.

The output beams 38(X) are directed outwardly in outward directions that substantially match the unique input direction in which the original beam 34(X) is inputted. In this context, substantially matching means that the outward direction is related to the input direction in a manner that enables the wearer's eye to focus any combination of the output beams 38(X) to a single point on the retina, thus reconstructing the image point X (see below).

For a flat optical component (that is, whose front and rear surfaces lie substantially parallel to the xy-plane in their entirety), the output beams are substantially parallel to one another (to at least within the angle $\Delta\beta$ subtended by two adjacent display pixels) and propagate outwardly in an output propagation direction $\hat{k}_{out}(X)$ that is parallel to the unique inward direction $\hat{k}_{in}(X)$ in which the corresponding input beam 34(X) was directed to the incoupling SRG (52). That is, directing the beam 34(X) corresponding to the image point X to the incoupling SRG (52) in the inward direction $\hat{k}_{in}(X)$ causes corresponding output beams 38(X) to be diffracted outwardly and in parallel from the exit zone (16), each in an outward propagation direction $\hat{k}_{out}(X)=\hat{k}_{in}(X)$ due to the configuration of the various SRGs (see below).

As will now be described with reference to FIG. 7F, this enables a viewer's eye to reconstruct the image when looking at the exit zone (16). FIG. 7F shows a plan (xz) view of the optical component 10. The input beam 34(X) is in coupled to the optical component (10) resulting in multiple parallel output beams 38(X) being created at the various exit regions (E) in the manner discussed above. This can be equivalently expressed at the various output beams corresponding to all the image points forming the same virtual image (at infinity) as the corresponding input beams.

Because the beams 38(X) corresponding to the image point X are all substantially parallel, any light of one or more of the beam(s) 38(X) which is received by the eye (37) is focused as if the eye (37) were perceiving an image at infinity (i.e. a distant image). The eye (37) thus focuses such received light onto a single retina point, just as if the light were being received from the imaging optics (17) directly, thus reconstructing the image point X (e.g. pixel) on the retina. As will be apparent, the same is true of each active image point (e.g. pixel) so that the eye (37) reconstructs the whole image that is currently on the display (15).

However, in contrast to receiving the image directly from the optics (17)—from which only a respective single beam 34(X) of diameter D is emitted for each X—the output beams 38(X) are emitted over a significantly wider area i.e. substantially that of the exit zone (16), which is substantially larger than the area of the inputted beam ($\sim D^2$). It does not matter which (parts) of the beam(s) 38(X) the eye receives as all are focused to the same retina point—e.g., were the eye (37) to be moved horizontally (±x) in FIG. 7F, it is apparent that the image will still be perceived. Thus, no adaptation of the display system is required for, viewers with different pupillary distances beyond making the exit zone (16) wide enough to anticipate a reasonable range of pupillary distances, whilst viewers whose eyes are closer together will generally receive light from the side of the exit zone (16) nearer the incoupling zone (12) as compared with viewers whose eyes are further apart, both will nonetheless perceive the same image. Moreover, as the eye (37) rotates, different parts of the image are brought towards the centre of the viewer's field of vision (as the angle of the beams relative to the optical axis of the eye changes) with the image still remaining visible, thereby allowing the viewer to focus their attention on different parts of the image as desired.

The same relative angular separation $\Delta \beta$ exhibited the input beams corresponding any two adjacent pixels (Xa, Xb) is also exhibited by the corresponding sets of output beams 38(Xa), 38(Xb)—thus adjacent pixels are focused to adjacent retina points by the eye (37). All the various versions of the beam remain highly collimated as they propagate through the optical component (10), preventing significant overlap of pixel images as focused on the retina, thereby preserving image sharpness.

It should be noted that FIGS. 7A-7G are not to scale and that in particular beams diameters are, for the sake of clarity, generally reduced relative to components such as the display (15) than would typically be expected in practice.

The configuration of the incoupling SRG (52) will now be described with reference to FIGS. 8A and 8B, which show schematic plan and frontal views of part of the fold grating (52). Note, in FIGS. 8A and 8B, beams are represented by arrows (that is, their area is not represented) for the sake of clarity.

Figure 8A:
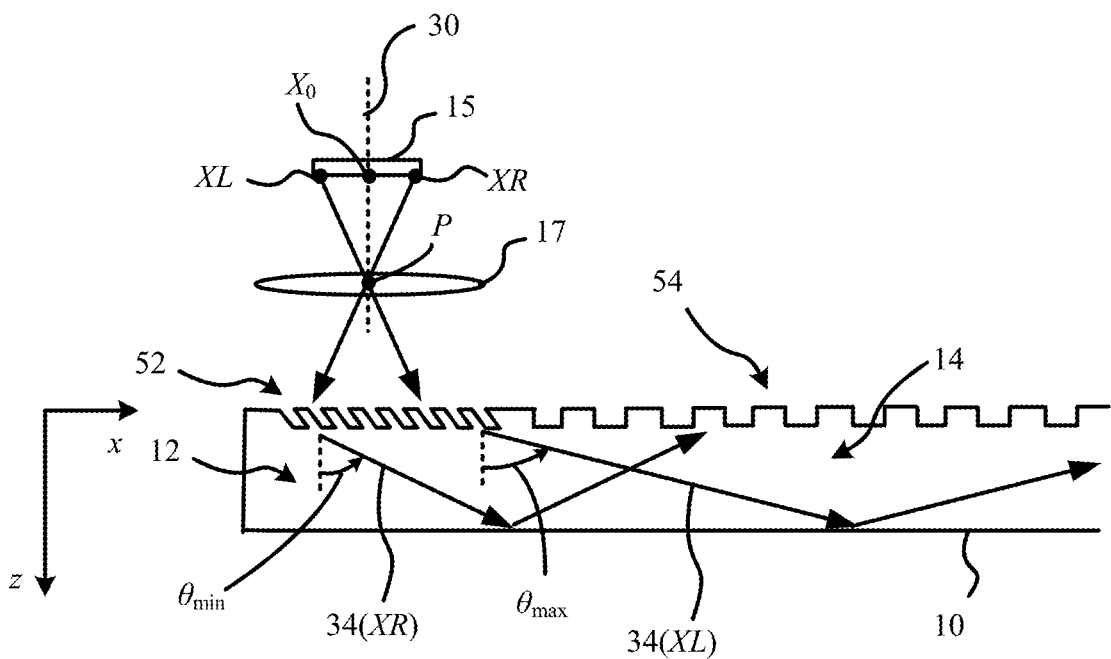
FIGS. 8A and 8B are plan and frontal views of a part of an optical component.

FIG. 8A shows two image points (XL, XR) located at the far left and far right of the display (15) respectively, from which light is collimated by the optics (17) to generate respective input beams 34(XL), 34(XR) in inward directions ($\theta_{in}$(XL), $\phi_{in}$(XL)), ($\theta_{in}$(XR), $\phi_{in}$(XR)). These beams are coupled into the optical component (10) by the incoupling SRG (52) as shown—the incoupled beams shown created at the incoupling SRG (52) are first order (+1) mode beams created by way of diffraction of the beams incident on the SRG (52). The beams 34(XL), 34(XR) as coupled into the waveguide propagate in directions defined by the polar angles $\theta$(XL), $\theta$(XR).

Figure 8B:
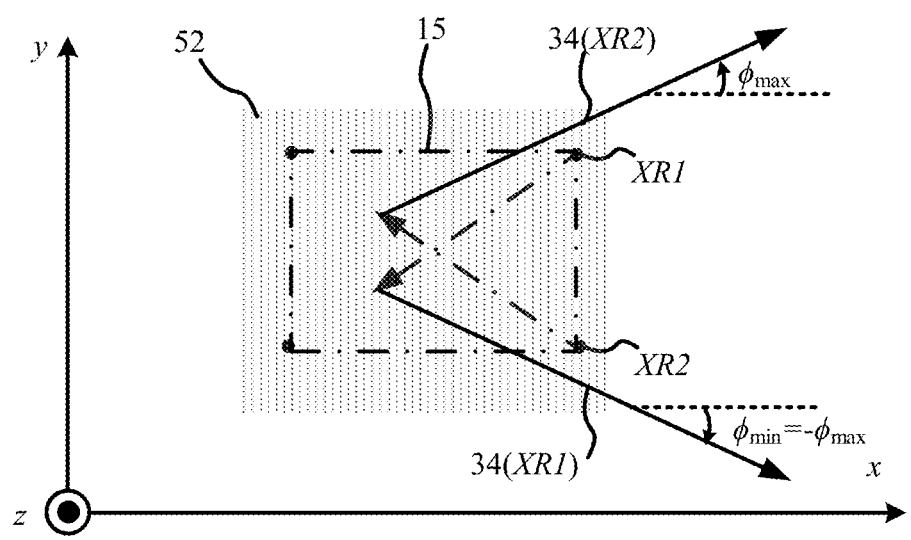

FIG. 8B shows two image points XR1 and XR2 at the far top-right and far bottom-right of the display (15). Note in this figure dashed-dotted lines denote aspects which are behind the optical component (10) (−z). Corresponding beams 34(XL), 34(XR) in directions within the optical component (10) with polar angles $\phi$(XL), $\phi$(XR).

Such angles $\theta$(X), $\phi$(X) are given by the (transmissive) grating equations:

$$n \sin \theta(X) \sin \phi(X) = \sin \theta_{in}(X) \sin \phi_{in}(X) \tag{2}$$

$$n \sin \theta(X) \cos \phi(X) = \sin \theta_{in}(X) \cos \phi_{in}(X) + \frac{\lambda}{d_1} \tag{3}$$

with the SRG (52) having a grating period $d_1$, the beam light having a wavelength $\lambda$, and n the refractive index of the optical component.

It is straightforward to show from equations (2), (3) that $\theta$(XL)=$\theta_{max}$ and $\theta$(XR)=$\theta_{min}$ i.e. that any beam as coupled into the component (10) propagates with an initial polar angle in the range [$\theta$(XR), $\theta$(XL)]; and that $\phi$(XR2)=$\phi_{max}$ and $\phi$(XR1)=$\phi_{min}$ ($\approx -\phi_{max}$ in this example) i.e. that any beam as coupled into the component initially propagates with an azimuthal angle in the range [$\phi$(XR1), $\phi$(XR2)] ($\approx$[−$\phi$(XR2), $\phi$(XR2)]).

The configuration of the fold SRG (54) will now be described with references to FIGS. 9A-9B. Note, in FIGS. 9A and 9B, beams are again represented by arrows, without any representation of their areas, for the sake of clarity. In these figures, dotted lines denote orientations perpendicular to the fold SRG grating lines, dashed lines orientations perpendicular to the incoupling SRG grating lines, and dash-dotted lines orientations perpendicular to the exit SRG grating lines.

Figure 9A:
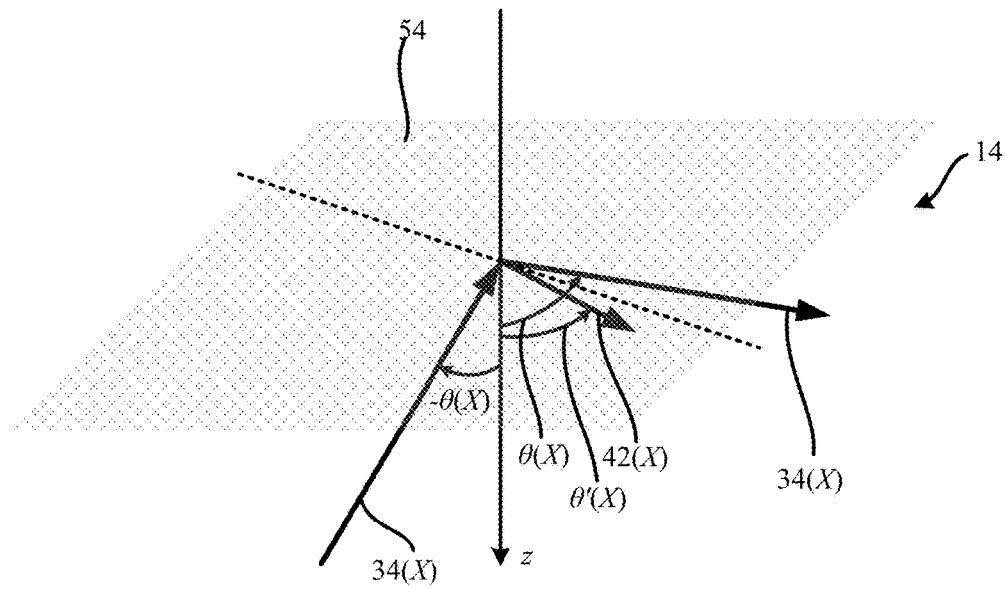
FIG. 9A shows a perspective view of beam reflection within a fold zone of a waveguide.

FIG. 9A shows a perspective view of the beam 34(X) as coupled into the fold zone (14) of the optical component (10), having been reflected from the front wall of the optical component (10) and thus travelling in the direction ($\phi$(X), −$\theta$(X)) towards the fold SRG (54). A dotted line (which lies perpendicular to the fold SRG grating lines) is shown to represent the orientation of the fold SRG.

The fold SRG (54) and incoupling SRG (52) have a relative orientation angle A (which is the angle between their respective grating lines). The beam thus makes an angle A+$\phi$(X) (see FIG. 9B) with the fold SRG grating lines as measured in the xy-plane. The beam (34) is incident on the fold SRG (54), which diffracts the beam (34) into different components. A zero order reflection mode (specular reflection) beam is created which continues to propagate in the direction ($\phi$(X), ±$\theta$(X)) just as the beam 34(X) would due to reflection in the absence of the fold SRG (54) (albeit at a reduced intensity). This specular reflection beam can be viewed as effectively a continuation of the beam 34(X) and for this reason is also labelled 34(X). A first order (−1) reflection mode beam 42(X) is also created which can be effectively considered a new version of the beam.

As indicated, the new version of the beam 42(X) propagates in a specific direction ($\phi$'(X), $\theta$'(X)) which is given by the known (reflective) grating equations:

$$n \sin \theta'(X) \sin(A + \phi'(X)) = n \sin \theta(X) \sin(A + \phi(X)) \tag{4}$$

$$n \sin \theta'(X) \cos(A + \phi'(X)) = n \sin \theta(X) \cos(A + \phi(X)) - \frac{\lambda}{d_2} \tag{5}$$

where the fold SRG has a grating period $d_2$, the beam light has a wavelength $\lambda$ and n is the refractive index of the optical component (10).

Figure 9B:
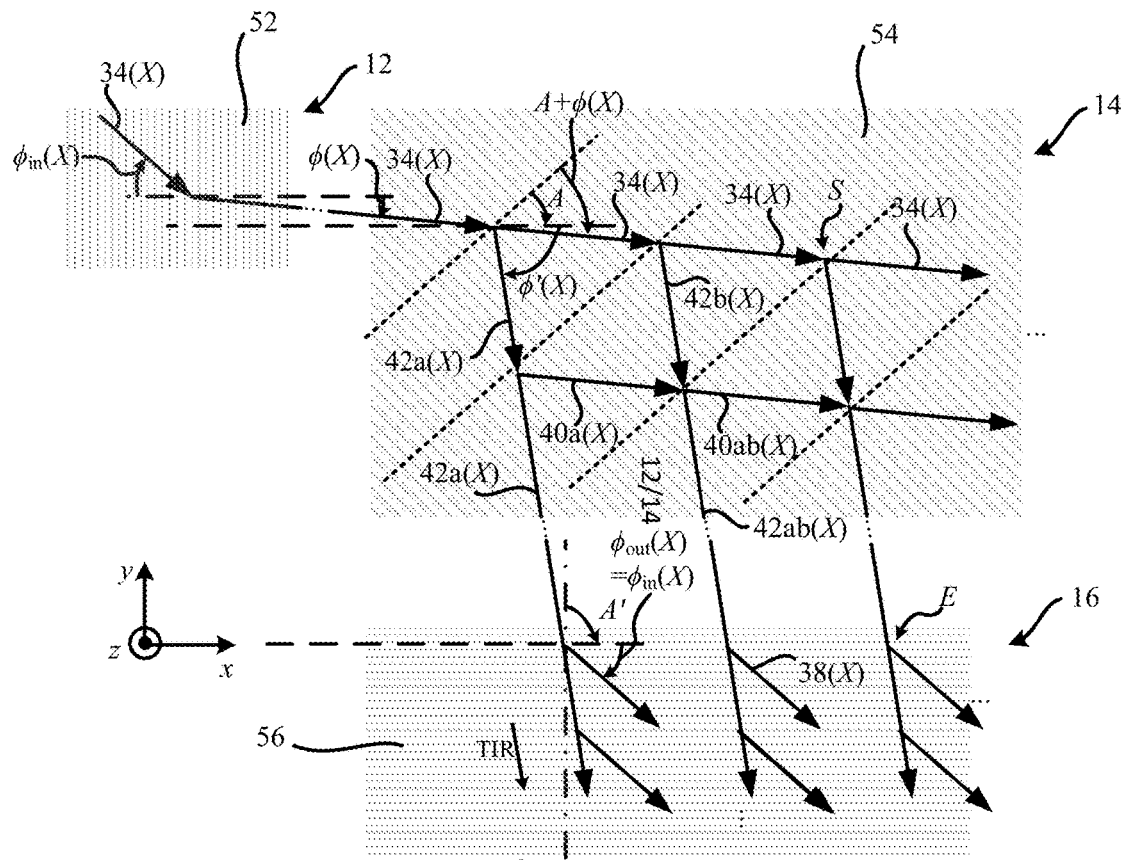
FIG. 9B illustrates a beam expansion mechanism.

As shown in FIG. 9B, which shows a schematic frontal view of the optical component (10), the beam 34(X) is coupled into the incoupling zone (12) with azimuthal angle $\phi(X)$ and thus makes an xy-angle $\phi(X)+A$ the fold SRG 54.

A first new version 42a(X) (−1 mode) of the beam 34(X) is created when it is first diffracted by the fold SRG (54) and a second new version 42b(X) (−1 mode) when it is next diffracted by the fold SRG 54 (and so on), which both propagate in xy-direction $\phi'(X)$. In this manner, the beam 34(X) is effectively split into multiple versions, which are horizontally separated (across the width of the fold zone 14). These are directed down towards the exit zone (16) and thus coupled into the exit zone (16) (across substantially the width of the exit zone 16 due to the horizontal separation). As can be seen, the multiple versions are thus incident on the various exit regions (labelled E) of the exit SRG (56), which lie along the width of the exit zone (16).

These new, downward (−y)-propagating versions may themselves meet the fold SRG (54) once again, as illustrated. However, it can be shown from equations (4), (5) that any first order reflection mode beam (e.g. 40a(X), +1 mode) created by diffraction at an SRG of an incident beam (e.g. 42a(X), −1 mode) which is itself a first order reflection mode beam created by an earlier diffraction of an original beam (e.g. 34(X)) at the same SRG will revert to the direction of the original beam (e.g. $\phi(X)$, $\pm\theta(X)$, which is the direction of propagation of 40a(X)). Thus, propagation within the fold zone (14) is restricted to a diamond-like lattice, as can be seen from the geometry of FIG. 9B. The beam labelled 42ab(X) is a superposition of a specular reflection beam created when 42b(X) meets the fold SRG (54) and a −1 mode beam created when 40a(X) meets the fold SRG (54) at substantially the same location; the beam labelled 42ab (X) is a superposition of a specular reflection beam created when 40a(X) meets the fold SRG (54) and a +1 mode beam created when 42b(X) meets the fold SRG at substantially the same location (and so on).

The exit SRG and incoupling SRG (52, 56) are oriented with a relative orientation angle A' (which is the angle between their respective grating lines). At each of the exit regions, the version meeting that region is diffracted so that, in addition to a zero order reflection mode beam propagating downwards in the direction $\phi'(X)$, $\pm\theta'(X)$, a first order (+1) transmission mode beam 38(X) which propagates away from the optical component (10) in an outward direction $\phi_{out}(X)$, $\theta_{out}(X)$ given by:

$$\sin \theta_{out}(X) \sin(A' + \phi_{out}(X)) = n \sin \theta'(X) \sin(A' + \phi'(X)) \quad (6)$$

$$\sin \theta_{out}(X) \cos(A' + \phi_{out}(X)) = n \sin \theta'(X) \cos(A' + \phi'(X)) + \frac{\lambda}{d_3} \quad (7)$$

The output direction $\theta_{out}(X)$, $\phi_{out}(X)$ is that of the output beams outside of the waveguide (propagating in air). For a flat waveguide, equations (6), (7) hold both when the exit grating is on the front of the waveguide—in which case the output beams are first order transmission mode beams (as can be seen, equations (6), (7) correspond to the known transmission grating equations)—but also when the exit grating is on the rear of the waveguide (as in FIG. 7F)—in which case the output beams correspond to first order reflection mode beams which, upon initial reflection from the rear exit grating propagate in a direction $\theta'_{out}(X)$, $\phi'_{out}(X)$ within the optical component (10) given by:

$$n \sin \theta'_{out}(X) \sin(A' + \phi'_{out}(X)) = n \sin \theta'(X) \sin(A' + \phi'(X)) \quad (6')$$

$$n \sin \theta'_{out}(X) \cos(A' + \phi'_{out}(X)) = n \sin \theta'(X) \cos(A' + \phi'(X)) + \frac{\lambda}{d_3} \quad (7')$$

These beams are then refracted at the front surface of the optical component, and thus exit the optical component in a direction $\theta_{in}(X)$, $\phi_{in}(X)$ given by Snell's law:

$$\sin \theta_{out}(X) = n \sin \theta'_{out}(X) \quad (8)$$

$$\phi'_{out}(X) = \phi_{out}(X) \quad (9)$$

As will be apparent, the conditions of equations (6), (7) follow straight forwardly from equations (6'), (7'), (8) and (9). Note that such refraction at the front surface, whilst not readily visible in FIG. 7F, will nonetheless occur in the arrangement of FIG. 7F.

It can be shown from the equations (2-7) that, when $$d = d_1 = d_3 \quad (10)$$

(that is, when the periods of the incoupling and exit SRGs 52, 56 substantially match);

$$d_2 = d/(2 \cos A); \quad (11)$$

and $$A' = 2A; \quad (12)$$

then $(\theta_{out}(X), \phi_{out}(X)) = (\theta_{in}(X), \phi_{in}(X))$.

Moreover, when the condition $$\sqrt{(1 + 8 \cos^2 A)} > \frac{nd}{\lambda} \quad (13)$$

is met, no modes besides the above-mentioned first order and zero order reflection modes are created by diffraction at the fold SRG (54). That is, no additional undesired beams are created in the fold zone when this criteria is met. The condition in equation (13) is met for a large range of A, from about 0 to 70 degrees.

In other words, when these criteria are met, the exit SRG (56) effectively acts as an inverse to the incoupling SRG (52), reversing the effect of the incoupling SRG diffraction for each version of the beam with which it interacts, thereby outputting what is effectively a two-dimensionally expanded version of that beam 34(X) having an area substantially that of the exit SRG (56) (»$D^2$ and which, as noted, is independent of the imaging optics 17) in the same direction as the original beam was inputted to the component (10) so that the outwardly diffracted beams form substantially the same virtual image as the inwardly inputted beams but which is perceivable over a much larger area.

In the example of FIG. 9B, A≈45° i.e. so that the fold SRG and exit SRGs (54, 56) are oriented at substantially 45 and 90 degrees to the incoupling SRG (52) respectively, with the grating period of the fold region $d_2 = d/\sqrt{2}$. However, this is only an example and, in fact, the overall efficiency of the display system is typically increased when A≥50°.

Figure 7G:
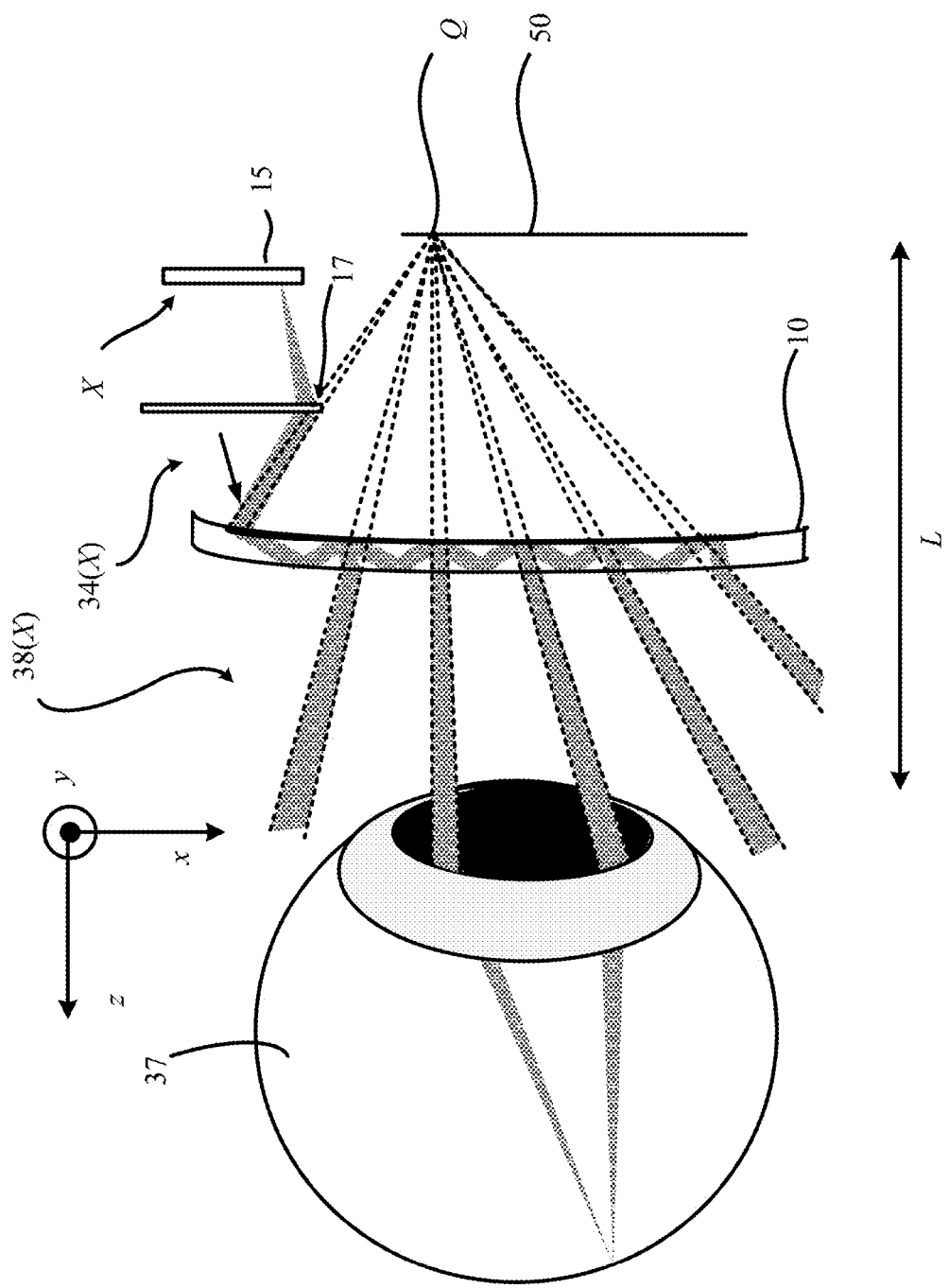
FIG. 7G is a plan view of a curved optical component.

The above considers flat optical components, but a suitably curved optical component (that is, having a radius of curvature extending substantially along the z direction) can be configured to function as an effective lens such that the output beams 38(X) are and are no longer as highly collimated and are not parallel, but have specific relative direction and angular separations such that each traces back to a common point of convergence—this is illustrated in FIG. 7G, in which the common point of convergence is labelled Q. Moreover, when every image point is considered, the various points of convergence for all the different active image points lie in substantially the same plane, labelled 50, located a distance L from the eye (37) so that the eye (37) can focus accordingly to perceive the whole image as if it were the distance L away. This can be equivalently stated as the various output beams forming substantially the same virtual version of the current display image as the corresponding input beams, but at the distance L from the eye (37) rather than at infinity. Curved optical components may be particularly suitable for short-sighted eyes unable to properly focus distant images.

Note, in general the "width" of the fold and exit zones does not have to be their horizontal extent-in general, the width of a fold or exit zone (14, 16) is that zone's extent in the general direction in which light is coupled into the fold zone 14 from the incoupling zone 12 (which is horizontal in the above examples, but more generally is a direction substantially perpendicular to the grating lines of the incoupling zone 12).

Returning to FIG. 2B, left and right input beams are guided though left and right waveguides (10L, 10R) onto the left and right eye respectively. Note that, for a transmissive arrangement in which the beams are coupled into and exit the optical component on opposite sides, is does not matter if the waveguides (10L, 10R) move relative to the left and right imaging components (15L/17L, 15R, 17R) as this does not change the orientation of the output beams i.e. even if the optical components rotate or move, the angular relationship between the input and output beams is unchanged (in this example, they remain parallel). It is only relative movement between the left components (15L/17L) and the right components (15R/17L) that introduces binocular disparity. Thus all that is needed to maintain binocular parity of the left and right images is to ensure that angular alignment of the left and right imaging components (15L/17L, 15R/17R) is preserved, which is achieved by housing them at the same central location and further aided by the rigid support structure.

This is true whenever for any type of incoupling optics and outcoupling optics (be they gratings or other structures) which are on opposite sides of the waveguide as this causes the waveguide to act like a periscope where the angle of a light ray entering the waveguide is equal to the angle of the light ray exiting the waveguide. Further details of this effect are described in the Applicant's International Patent Application PCT/US2014/016658, filed 17 Feb. 2014, which relates to coupling light into waveguides in a near-eye display device in a manner configured to be tolerant to misalignment of the waveguides with each other and/or other optics. For example, one arrangement disclosed therein provides a near-eye display device comprising one or more waveguides, wherein each waveguide comprises a light input coupling configured to receive light at a first side of the waveguide to couple the light into the waveguide, and a light output coupling configured to emit light from the waveguide at a second side of the waveguide, the second side of the waveguide being opposite the first side of the waveguide.

The support structure in the central portion (4) is sufficiently rigid to ensure that, during normal use of the system (1), beams OBL output from the left exit grating 16L of the left optical component 10L onto the user's left eye remain aligned with beams OBR output from the right exit grating 16R of the right optical component 10R onto the user's right eye to within ½ milliradian of their intended alignment (i.e. that for which the correct stereoscopic image is perceived), at least as measured relative to the vertical direction. Note that alignment to within 1 milliradian is acceptable in practice. As will be apparent in view of the foregoing, maintaining this level of angular alignment ensures alignment of the left and right images to within one pixel at least in the vertical direction. Vertical disparity is generally being more perceptible to the HVS than horizontal disparity as discussed, but horizontal alignment may nonetheless be preserved to the same precision by some support structures. As will be apparent, a variety of sufficiently stiff, lightweight materials can be used to make the support structure.

Figure 10:
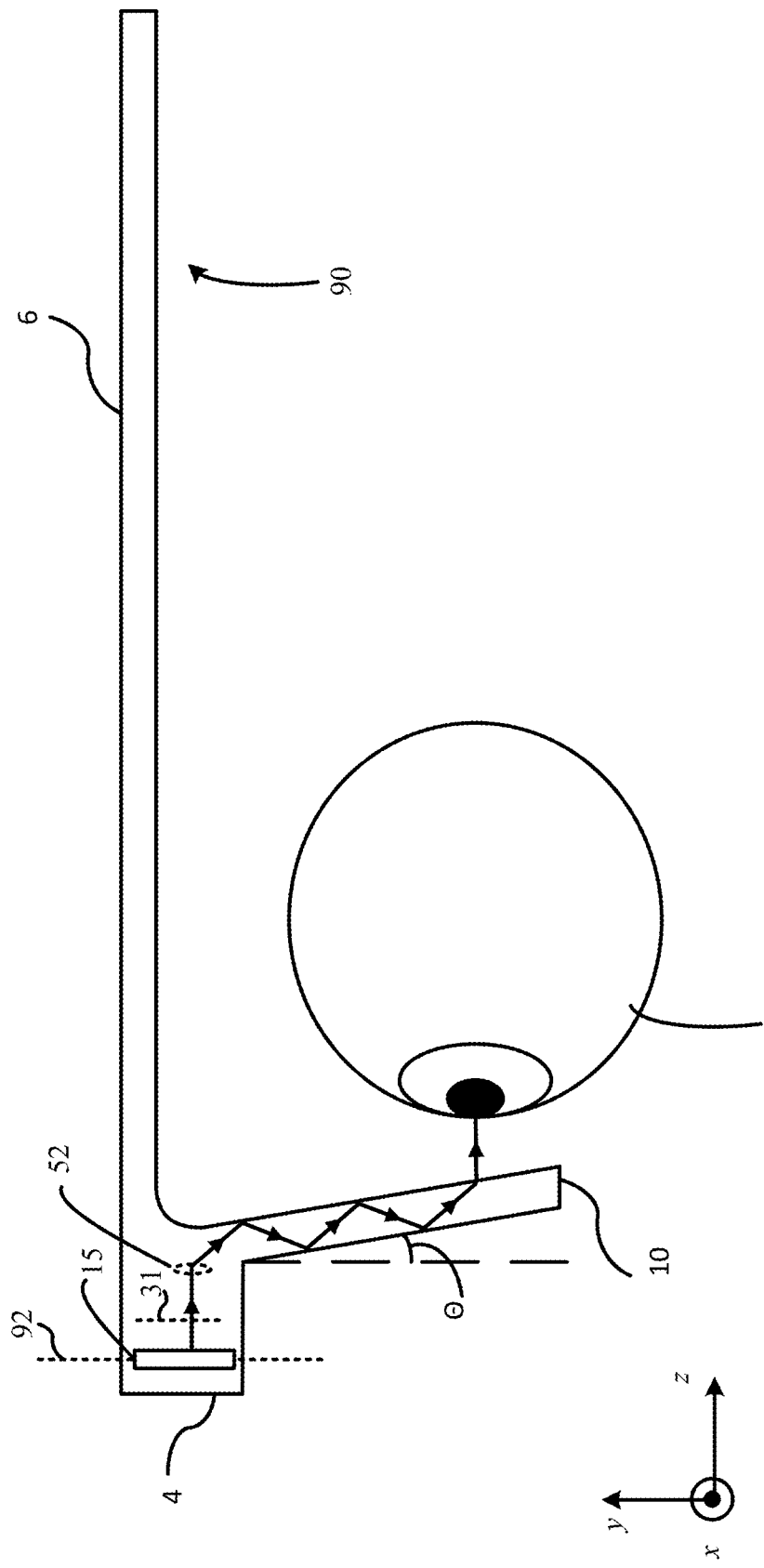
FIG. 10 shows a side view of a display system.

FIG. 10 shows another feature of the head mounted display. FIG. 10 is a view looking from the side of the head mounted display shown in FIG. 1. It shows one of the support extensions 6 and the mounting portion 4. The wearer's ears are not shown in FIG. 10, but it will be understood that a part (90) of the support extension (6) fits over an ear of the user and extends horizontally therefrom towards the front of the user's face. The display (15) lies in a plane (92), which is shown to be vertical and substantially perpendicular to the support extension (6) in the figures. However, in general the display can be arranged in any orientation (e.g. the display panel can be even in horizontal position) depending on how the folding optics of the light engine is implemented.

FIG. 10 also shows the optical component (10) and in particular shows that the optical component (10) is not arranged vertically with respect to the supporting extension (6). Instead, the optical component (10) extends at an angle towards the user's eye. In FIG. 7, the vertical is shown by a dotted line and the angle is shown as an acute angle Θ.

Figure 11:
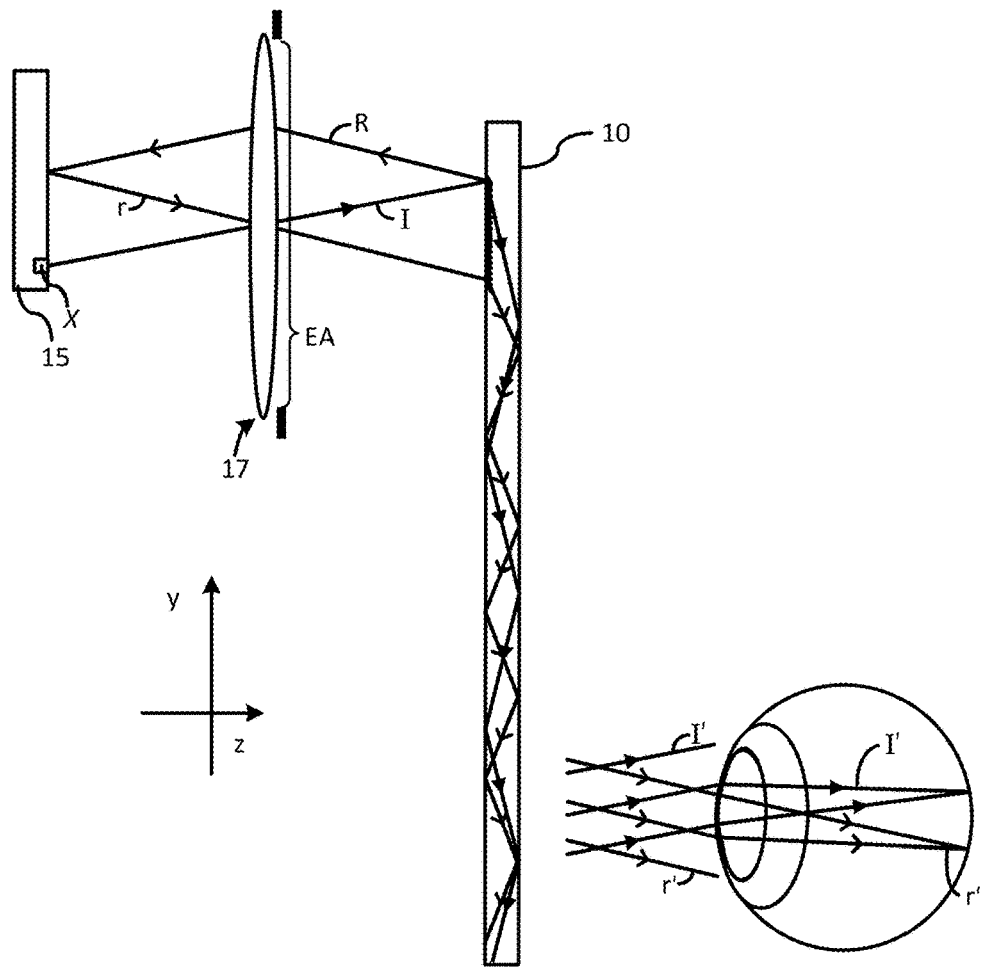
FIG. 11 shows how ghost images may be created in certain display systems.
Figure 12:
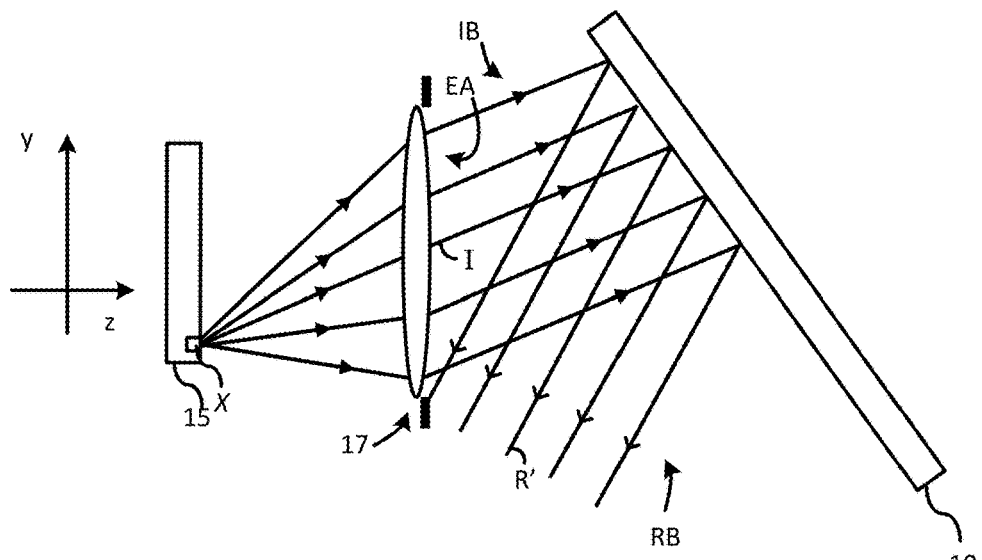
FIG. 12 illustrates a mechanism by which ghost images can be eliminated.

The reason for this is shown in FIGS. 11 and 12. As shown in FIGS. 11 and 12, the light engine 13 has an exit aperture EA. The exit aperture may for instance be formed in a housing of the light engine, or a partition which separates the internal optics of the light engine from the waveguide. Light can only enter or exit the light engine 13 via the exit aperture EA. FIG. 11 shows how the light may behave when the optical component is arranged truly vertically. Consider the incident ray labelled (I) which comes from a pixel (X) of the micro display (15) and is incident on the incoupling grating (12). For this incident ray (I), the angle of incidence is such that there is a reflected ray (R) which is reflected back through the imaging optics (17) and is incident on the display (15). As the display (15) has some reflectivity at its surface, a ghost reflection (r) is reflected off the micro display and formed by the imaging optics (17) onto the in-coupling grating (12) of the optical component. Thus, in addition to the desired ray (I) which is guided through total internal reflection through the optical component and diffracted out to the user's eye (as output rays I'), there is a ghost image formed by the reflective beam (R/r) which is also guided through total internal reflection and ends up incident on the user's eye (as output rays r'). Although the light level of the ghost image might be small, nevertheless, it is an irritant to the user and destroys his clarity of vision of the intended image.

FIG. 12 shows how this ghost image can be removed by angling the optical component (10) in the yz-plane at an angle Θ relative to the plane (92), with the bottom of the optical component (10) angled towards the user (i.e. so that the bottom of the optical component 10 is nearer the user than the top of the optical component 10). In this case, the incident ray I is similarly reflected from the in-coupling grating (12), but the reflective beam R' in this case is reflected at an angle which does not hit the lens of the optics (17). The angle Θ is sufficiently large that this is the case for all rays from X (which are collimated to form an incident beam IB) so that the version RB of the incident beam IB that is outwardly reflected by the optical component (10) propagates entirely clear of the optics (17). Thus, no ghost image of the pixel X is formed.

To ensure that no ghost images of any pixels are formed, this should hold true for all pixels on the display (recall, each pixel results in a single respective beam), thus the angle Θ is dependent on the arrangement of the display 15, optics 17 and optical component 10 relative to one another. When the optical component is tilted vertically towards the user as in FIG. 12, it is sufficient for the angle Θ to be large enough that the beams from the lower-most row of pixels are reflected clear of the collimating optics as these reflected beams will come to the optics (17) than any other beams because they have the smallest angles of incidence in the yz-plane.

Note that the above arrangement of the light engine 13 is just an example. For example, an alternative light engine based on so-called scanning can provide a single beam, the orientation of which is fast modulated whilst simultaneously modulating its intensity and/or colour. As will be apparent, a virtual image can be simulated in this manner that is equivalent to a virtual image that would be created by collimating light of a (real) image on a display with collimating optics.

The relevant factor with regards to preventing ghosting is the angle at which the collimated beams from the light engine meet the light guide plate, which is true whatever the configuration of the light engine. Ghosting will be eliminated provided beam back-reflected versions of the beam cannot re-enter the light engine. Thus, ghosting is eliminated whenever the angle between the light engine and the optical component is such that there will be no reflections from the plate back to the light engine exit aperture at any angular values of the field of view of the light engine.

Whilst in the above the optical components are tilted vertically towards the user, ghosting can be eliminated by angling each optical component, relative to the plane 92 in which the display 15 of the light engine lines, in the any direction, provided each optical component is tilted relative to the light engine by an angle large enough that all reflected beams clear the exit aperture.

The optical component (10) can be mounted at the angle Θ using any suitable mounting mechanism; in particular it could be fixed into portion of the frame which already tilted at this angle to provide support for the optical component at this angle.

Note that the elimination of ghosting by tilting can be used in other types of display system, for example one in which beams from the same display are coupled into left and right optical waveguide components so that an image is perceived by both eyes from a single display, or in which a single waveguide is used to provide an image from a single display to one eye only.

Whilst the above covers Surface Relief Gratings, the subject matter is applicable to other structures for example other diffractive based waveguide displays, and reflective (non-diffractive) waveguide displays.

According to a first aspect, a wearable image display system comprises a headpiece, a first and a second light engine, and a first and a second optical component. The first and second light engines are configured to generate a first and a second set of beams respectively. Each beam is substantially collimated so that the first and second set form a first and a second virtual image respectively. The light engines are mounted on the headpiece. Each optical component is located to project an image onto a first and a second eye of a wearer respectively and comprises an incoupling structure and an exit structure. The first and second sets of beams are directed to the incoupling structures of the first and second optical components respectively. The exit structures of the first and second optical components are arranged to guide the first and second sets of beams onto the first and second eyes respectively. The optical components are located between the light engines and the eyes. Both of the light engines are mounted to a central portion of the headpiece.

In embodiments, the system may comprise a support structure mounted to the central portion which supports the first and second light engines, the support structure more rigid than the headpiece.

The support structure may be sufficiently rigid to maintain vertical alignment between the first and second sets of beams to within substantially one milliradian. In addition, horizontal alignment between the first and second sets of beams may also maintained by the support structure to within substantially one milliradian. The support structure ma for example formed of carbon fibre or titanium.

Each optical component may comprise a fold structure which manipulates the spatial distributions of the beams within the waveguide.

The optical components may be substantially transparent whereby a user can see through them to view a real-world scene simultaneously with the projected images.

The first and second sets of beams may be directed from first and second exit apertures of the first and second light engine respectively, and the optical components may be angled relative to the light engines such that any outwardly reflected versions of the beams propagate clear of the exit apertures.

The first and second images may differ from one another so that a stereoscopic image is perceived by the wearer.

The first light engine may comprise a first display on which a first image is generated, and collimating optics arranged to generate the first set of beams from the first image on the first display; the second light engine may comprise a second display on which a second image is generated, and collimating optics arranged to generate the second set of beams from the second image on the second display.

The structures may be gratings, whereby the beams are diffracted onto the eye.

The headpiece may comprise a frame, helmet or headband.

The optical components may for example be formed of glass or polymer.

According to a second aspect, a wearable image display system comprises a headpiece, collimating optics, a first and a second display on which a first and a second image is generated respectively, a first and a second display on which a first and a second image is generated respectively, and a first and a second optical component. The displays are mounted on the headpiece. Each optical component is located to project an image onto a first and a second eye of a wearer respectively and comprises an incoupling structure and an exit structure. The collimating optics is arranged to substantially collimate each image into respective beams and to direct the beams of the first and second images to the incoupling structures of the first and second optical components respectively. The exit structures of the first and second optical components are arranged to diffract versions of the first and second images onto the first and second eyes respectively. The optical components are located between the collimating optics and the eyes. Both of the displays and the collimating optics are mounted to a central portion of the headpiece.

In embodiments, the optical components may be substantially transparent whereby a user can see through them to view a real-world scene simultaneously with the projected images.

The first and second images may differ from one another so that a stereoscopic image is perceived by the wearer.

According to a third aspect, a wearable image display system comprises a frame, collimating optics, a first and a second display on which a first and a second image is generated respectively, and a first and a second optical component. The displays mounted on the frame. Each optical component is located to project an image onto a first and a second eye of a wearer respectively and comprises an incoupling grating and an exit grating. The collimating optics is arranged to substantially collimate each image into respective beams and to direct the beams of the first and second images to the incoupling gratings of the first and second optical components respectively. The exit gratings of the first and second optical components are arranged to diffract versions of the first and second images onto the first and second eyes respectively. The optical components are located between the collimating optics and the eyes. A support structure is mounted to a central portion of the frame and supports the first and second displays and the collimating optics, the support structure more rigid than the frame.

The support structure may be sufficiently rigid to maintain vertical alignment between the diffracted versions of the first and second images to within substantially one milliradian. Horizontal alignment between the diffracted versions of the first and second images may also be maintained by the support structure to within substantially one milliradian.

Each optical component may comprise a fold grating which manipulates the spatial distributions of the beams within the waveguide.

The optical components may be substantially transparent whereby a user can see through them to view a real-world scene simultaneously with the projected images.

The first and second images may differ from one another so that a stereoscopic image is perceived by the wearer.

According to a fourth aspect, a wearable image display system comprises a headpiece, a light engine, and an optical component. The light engine is mounted on the headpiece and configured to generate beams, each of the beams being substantially collimated so that the beams form a virtual image. The optical component is located to project an image onto an eye of a wearer and comprises an incoupling structure and an exit structure. The beams are directed from an exit aperture of the light engine to the in-coupling structure of the optical component. The exit structure is arranged to guide the beams onto the eye. The optical component is located between light engine and the eye. The optical component is angled relative to the light engine such that any outwardly reflected versions of the beams propagate clear of the exit aperture.

In embodiments, the light engine may comprise a display on which an image is generated, and collimating optics arranged to generate the beams from the image on the display.

The structures may be gratings, whereby the beams are diffracted onto the eye.

The optical component may be angled towards the wearer.

The optical component may comprise a fold structure which manipulates the spatial distributions of the beams within the waveguide.

The optical component may be substantially transparent whereby a user can see through it to view a real-world scene simultaneously with the projected image.

The optical component may comprise two such light engines, each configured to generate a respective such virtual image, and two such optical components wherein the virtual images differ from one another so that a stereoscopic image is perceived by the wearer.

The optical components may for example be formed of glass or polymer.

The light engine may be mounted to a central portion of the frame.

The headpiece may comprise a frame, helmet or headband.

According to a fifth aspect, a wearable image display system comprises a headpiece, a display on which an image is generated, an optical component, and collimating optics. The display is mounted on the headpiece and lies in a plane. The optical component is located to project an image onto an eye of a wearer and comprises an incoupling structure and an exit structure. The collimating optics is arranged to substantially collimate the image into beams and to direct the beams to the in-coupling structure of the optical component. The exit structure is arranged to guide the beams onto the eye. The optical component is angled relative to said plane by an amount such that that any outwardly reflected versions of the beams propagate clear of the collimating optics.

The structures may be gratings, whereby the beams are diffracted onto the eye.

The optical component may be angled towards the wearer.

The optical component may comprise a fold structure which manipulates the spatial distributions of the beams within the waveguide.

The optical component may be substantially transparent whereby a user can see through it to view a real-world scene simultaneously with the projected image.

The optical component may for example be formed of glass or polymer.

According to a sixth aspect, a wearable image display system comprises a headpiece; a first and a second display on which a first and a second image is generated respectively, a first and a second optical component, and collimating optics. The displays are mounted on the headpiece and lie in a plane. Each optical component is located to project an image onto a first and a second eye of a wearer respectively and comprises an incoupling grating and an exit grating. The collimating optics is arranged to substantially collimate each image into respective beams and to direct the beams of the first and second images to the incoupling gratings of the first and second optical components respectively. The exit gratings of the first and second optical components is arranged to diffract versions of the first and second images onto the first and second eyes respectively. The optical components is located between the collimating optics and the eyes. Each optical component is angled relative to said plane by an amount such that any outwardly reflected versions of the beams propagate clear of the collimating optics.

The first and second images may differ from one another so that a stereoscopic image is perceived by the wearer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A wearable image display system comprising:
   a frame;
   a first and a second light engine configured to generate a first and a second set of beams respectively, the beams substantially collimated within each set so that the first and the second set form a first and a second virtual image respectively, the light engines mounted on the frame at a first angle relative to a vertical plane; and
   a first and a second optical component mounted on the frame at a different angle than the first angle relative to the vertical plane, the first and the second optical components comprising respective incoupling structures, respective fold structures configured to manipulate spatial distributions of the first and the second set of beams within each optical component, and respective exit structures, where the respective incoupling structures are configured to receive the first and the second set of beams and the respective exit structures are configured to guide the first and the second sets of beams onto eyes of a wearer of the wearable image display system.

2. The wearable image display system according to claim 1, wherein each fold structure comprises surface modulations on surfaces of the first and the second optical components.

3. The wearable image display system according to claim 1, wherein:
   the first and the second light engines comprise exit apertures;
   the different angle than the first angle comprises a tilt of the first and the second optical components with respect to the first and the second light engines; and
   the tilt is configured to cause outwardly reflected versions of the beams off the first and the second optical components to propagate clear of the exit apertures.

4. The wearable image display system according to claim 3, wherein the tilt is further configured to prevent ghosting originating from the outwardly reflected versions of the beams.

5. The wearable image display system according to claim 1, wherein the first light engine comprises:
   a first display on which a first image is generated; and
   collimating optics arranged to generate the first set of beams from the first image on the first display.

6. The wearable image display system according to claim 5, wherein the first display is substantially aligned with the vertical plane.

7. The wearable image display system according to claim 1, further comprising extensions mounted to the frame and configured to support the wearable image display system over ears of the wearer.

8. The wearable image display system according to claim 1, wherein the first and the second optical components are formed of glass.

9. The wearable image display system according to claim 1, wherein the first and the second optical components are formed of polymer.

10. A wearable image display system comprising:
    a frame;
    first and second displays on which first and second images are generated respectively, the first and second displays mounted on the frame;
    first and second optical components comprising respective incoupling structures and respective exit structures; and
    collimating optics mounted on the frame, the collimating optics arranged to substantially collimate beams of the first and second images and to direct the beams to the respective incoupling structures of the first and second optical components, the respective exit structures of the first and second optical components being configured to diffract the beams of the first and second images toward first and second eyes of a wearer of the wearable image display system, wherein the optical components are mounted on the frame with a tilt about a horizontal axis with respect to a vertical plane defined by the first and second displays.

11. The wearable image display system according to claim 10, wherein the first and second displays and the collimating optics comprise light engines.

12. The wearable image display system according to claim 11, wherein the tilt of the first and second optical components is configured to direct reflections away from the light engines, the reflections formed from the beams of the first and second images reflecting off a side of the optical components facing the collimated optics.

13. The wearable image display system according to claim 12, wherein the tilt of the first and second optical components is configured to direct a portion of the reflections originating from pixels at an upper edge of the first and second displays to a point below the collimating optics.

14. The wearable image display system according to claim 10, further comprising a support structure mounted to the frame and supporting the first and second displays, the support structure configured to maintain horizontal alignment between diffracted versions of the first and second images to within one milliradian.

15. The wearable image display system according to claim 10, wherein the tilt of the first optical component is configured to prevent formation, in the first optical component, of a ghost image of the first image.

16. The wearable image display system according to claim 15, wherein the ghost image is formed from a reflection of the first image off of the first optical component.

17. A system comprising:
    a frame;
    first and second displays on which first and second images are generated respectively, the first and second displays mounted on the frame and defining a vertical plane;
    first and second optical components mounted on the frame with a tilt with respect to a horizontal axis that passes through the vertical plane, the first and second optical components comprising respective incoupling gratings and respective exit gratings; and
    collimating optics arranged to substantially collimate beams of the first and second images from the first and second displays to the respective incoupling gratings of the first and second optical components.

18. The system according to claim 17, wherein the optical components are substantially transparent.

19. The system according to claim 17, wherein the first and second images comprise a stereoscopic image.

20. The system according to claim 17, wherein the tilt is configured to direct reflections of the beams off the first and second optical components away from exit apertures of the collimating optics.

* * * * *